US012672032B2

(12) United States Patent
Teyeb et al.

(10) Patent No.: US 12,672,032 B2
(45) Date of Patent: Jun. 30, 2026

(54) EI SIGNALING FOR GROUP HANDOVER

(71) Applicant: Telefonaktiebolaget LM Ericsson (PUBL), Stockholm (SE)

(72) Inventors: Oumer Teyeb, Montréal (CA); Filip Barac, Huddinge (SE); Ajmal Muhammad, Sollentuna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 466 days.

(21) Appl. No.: 18/007,235

(22) PCT Filed: Jul. 29, 2021

(86) PCT No.: PCT/SE2021/050762
§ 371 (c)(1),
(2) Date: Jan. 27, 2023

(87) PCT Pub. No.: WO2022/025816
PCT Pub. Date: Feb. 3, 2022

(65) Prior Publication Data
US 2023/0292185 A1 Sep. 14, 2023

Related U.S. Application Data

(60) Provisional application No. 63/059,224, filed on Jul. 31, 2020.

(51) Int. Cl.
*H04W 36/00* (2009.01)
*H04W 36/08* (2009.01)

(52) U.S. Cl.
CPC ... *H04W 36/0009* (2018.08); *H04W 36/0033* (2013.01); *H04W 36/08* (2013.01)

(58) Field of Classification Search
CPC ......... H04W 36/0009; H04W 36/0033; H04W 36/08; H04W 84/00
See application file for complete search history.

(56) References Cited

U.S. PATENT DOCUMENTS

| | | | | |
|---|---|---|---|---|
| 8,897,262 B2 * | 11/2014 | Van Phan | ............ | H04B 7/2606 |
| | | | | 370/310.2 |
| 12,284,706 B2 * | 4/2025 | Kim | ...................... | H04W 76/16 |
| 2009/0245177 A1 * | 10/2009 | Zhao | ..................... | H04W 76/34 |
| | | | | 370/328 |

(Continued)

FOREIGN PATENT DOCUMENTS

WO WO-2018119123 A1 * 6/2018 ........ H04W 28/0263

OTHER PUBLICATIONS

3GPP TSG RAN Meeting #86; Sitges, Spain; Source: Qualcomm; Title: New WID on Enhancements to Integrated Access and Backhaul (RP-193251 (Revision of RP-193145))—Dec. 9-12, 2019. (Year: 2019).*

(Continued)

*Primary Examiner* — Yuwen Pan
*Assistant Examiner* — Swati Jain
(74) *Attorney, Agent, or Firm* — Baker Botts L.L.P.

(57) ABSTRACT

According to certain embodiments, a method in a network node for performing a group handover comprises receiving an indication to perform a bearer context operation on a plurality of bearer contexts and performing the indicated bearer operation on the plurality of bearer contexts.

20 Claims, 22 Drawing Sheets

1500

1512 – receive an indication to perform a bearer context operation on a plurality of bearer contexts 1514 – perform the indicated bearer context operation on the plurality of bearer contexts

(56) References Cited

U.S. PATENT DOCUMENTS

| | | | | |
|---|---|---|---|---|
| 2014/0105125 A1* | 4/2014 | Chaponniere | .......... | H04W 76/32 |
| | | | | 370/329 |
| 2015/0109898 A1* | 4/2015 | Wang | .................... | H04W 76/19 |
| | | | | 370/216 |
| 2015/0282199 A1* | 10/2015 | Du | ......................... | H04W 74/04 |
| | | | | 370/312 |
| 2015/0288828 A1* | 10/2015 | Lim | ...................... | H04M 15/41 |
| | | | | 455/552.1 |
| 2017/0251357 A1* | 8/2017 | Iwai | ...................... | H04W 92/14 |
| 2020/0100115 A1* | 3/2020 | Skaaksrud | ............ | G01N 33/004 |
| 2020/0162920 A1* | 5/2020 | Kim | .................... | H04W 12/106 |
| 2022/0279391 A1* | 9/2022 | Bae | ................... | H04W 36/0033 |
| 2022/0329355 A1* | 10/2022 | Liu | ........................... | H04L 1/08 |
| 2023/0403114 A1* | 12/2023 | Ko | ............................ | G01S 5/02 |
| 2024/0129181 A1* | 4/2024 | Yoo | ......................... | H04L 67/10 |

OTHER PUBLICATIONS

"3rd Generation Partnership Project; Technical Specification Group Radio Access Network; NR; Study on Integrated Access and Backhaul; (Release 16)", 3GPP Draft; 38874-G00, Jan. 11, 2019. (Year: 2019).*

Ericsson: "(TP for NR-IAB BL CR for TS 38.423): Corrections to BL CR", 3GPP Draft; R3-203816, 3rd Generation Partnership Project (3GPP), vol. RAN WG3, No. Online; Jun. 1, 2020- Jun. 11, 2020, May 21, 2020. (Year: 2020).*

Ericsson: "Inter-donor Migration in IAB Networks—General Principles", 3GPP Draft; R3-205221, 3rd Generation Partnership Project (3GPP), vol. RAN WG3, No. Online; Aug. 17-27, 2020. (Year: 2020).*

"3rd Generation Partnership Project; Technical Specification Group Radio Access Network; NR; Study on Integrated Access and Backhaul; (Release 16)", 3GPP Draft; 38874-G00, Jan. 11, 2019 (Year: 2019) (Year: 2019).*

Ericsson: "(TP for NR-IAB BL CR for TS 38.423): Corrections to BL CR", 3GPP Draft; R3-203816, 3rd Generation Partnership Project (3GPP), vol. RAN WG3, No. Online; Jun. 1, 2020-Jun. 11, 2020, May 21, 2020. (Year: 2020) (Year: 2020).*

3GPP TS 38.423 V16.1.0 (Mar. 2020); 3rd Generation Partnership Project; Technical Specification Group Radio Access Network; NG-RAN; Xn application protocol (XnAP) (Release 16).

3GPP TSG RAN Meeting #86; Sitges, Spain; Source: Qualcomm; Title: New WID on Enhancements to Integrated Access and Backhaul (RP-193251 (Revision of RP-193145))—Dec. 9-12, 2019.

3GPP TS 38.401 V16.1.0; 3rd Generation Partnership Project; Technical Specification Group Radio Access Network; NG-RAN; Architecture description (Release 16)—Mar. 2020.

3GPP TS 38.463 V16.1.1; 3rd Generation Partnership Project; Technical Specification Group Radio Access Network; NG-RAN; E1 Application Protocol (E1AP) (Release 16)—Apr. 2020.

3GPP TS 37.340 V16.1.0; 3rd Generation Partnership Project; Technical Specification Group Radio Access Network; Evolved Universal Terrestrial Radio Access (E-UTRA) and NR; Multi-connectivity; Stage 2 (Release 16)—Mar. 2020.

3GPP TS 38.473 V16.1.0; 3rd Generation Partnership Project; Technical Specification Group Radio Access Network; NG-RAN; F1 application protocol (F1AP) (Release 16)—Mar. 2020.

3GPP TSG-RAN WG3 Meeting #108-e, Online; Source: Ericsson; Title: (TP for NR-IAB BL CR for TS 38.423): Corrections to BL CR (R3-203816)—Jun. 1-11, 2020.

3GPP TSG-RAN WG3 Meeting #109-e, Online; Source: Ericsson; Title: Inter-donor Migration in IAB Networks—General Principles (R3-205221)—Aug. 17-27, 2020.

3GPP TR 38.874 V16.0.0; 3rd Generation Partnership Project; Technical Specification Group Radio Access Network; NR; Study on Integrated Access and Backhaul; (Release 16)—Dec. 2018.

PCT International Search Report issued for International application No. PCT/SE2021/050762—Nov. 30, 2021.

PCT Written Opinion of the International Searching Authority issued for International application No. PCT/SE2021/050762—Nov. 30, 2021.

Office Action issued by the Government of the People's Republic of Bangladesh, Department of Patents, Industrial Designs & Trademarks for Patent Application No. 240/2021/1027—Jun. 4, 2024.

* cited by examiner

1500

1512 – receive an indication to perform a bearer context operation on a plurality of bearer contexts 1514 – perform the indicated bearer context operation on the plurality of bearer contexts

1550

1552 – transmit to a network node an indication to perform a bearer context operation on a plurality of bearer contexts 1554 – receive an indication of a result of the bearer context operation from the second network node

710
Host computer provides user data

720
Host computer initiates transmission carrying the user data to the UE

730
UE receives the user data

611
Host computer executes client application

610
Host computer provides user data

620
Host computer initiates transmission carrying the user data to the UE

630
Base station transmits the user data

640
UE executes client application

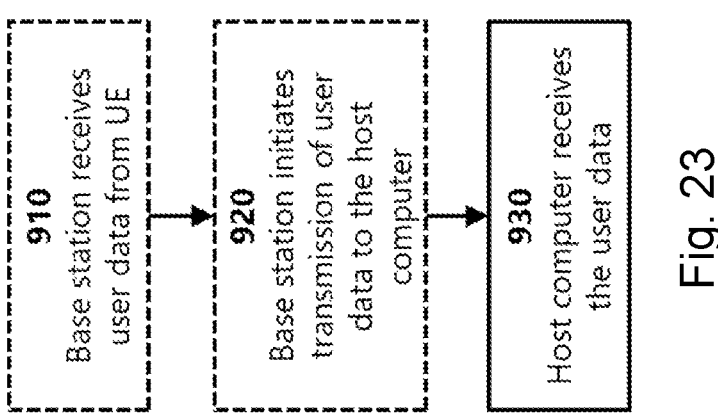

910
Base station receives user data from UE

920
Base station initiates transmission of user data to the host computer

930
Host computer receives the user data

Fig. 23

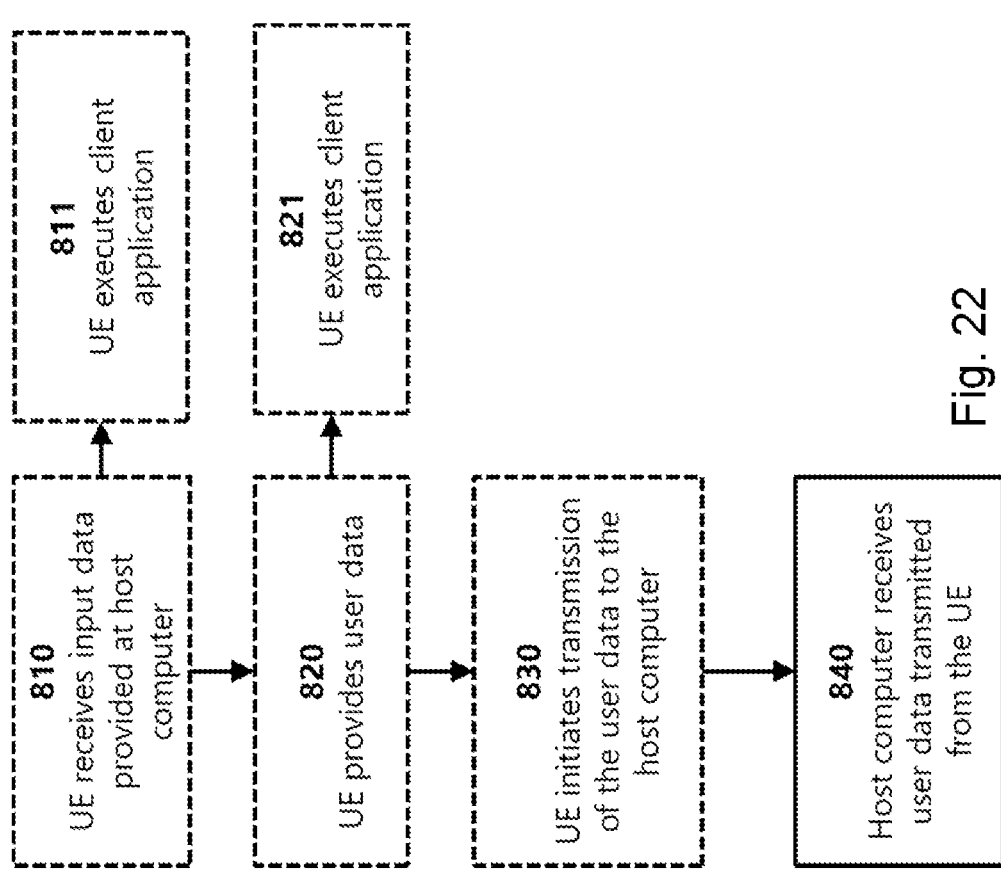

811
UE executes client application

821
UE executes client application

810
UE receives input data provided at host computer

820
UE provides user data

830
UE initiates transmission of the user data to the host computer

840
Host computer receives user data transmitted from the UE

Fig. 22

EI SIGNALING FOR GROUP HANDOVER

PRIORITY

This nonprovisional application is a U.S. National Stage Filing under 35 U.S.C. § 371 of International Patent Application Serial No. PCT/SE2021/050762 filed Jul. 29, 2021 and entitled "EI SIGNALLING FOR GROUP HANDOVER" which claims priority to U.S. Provisional Patent Application No. 63/059,224 filed Jul. 31, 2020 both of which are hereby incorporated by reference in their entirety.

TECHNICAL FIELD

Embodiments of the present disclosure are directed to wireless communications and, more particularly, to E1 signaling for group handover.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

FIG. 1 illustrates the current next generation radio access network (NG-RAN). The NG-RAN consists of a set of gNBs connected to a fifth generation core (5GC) through the NG interface. As specified in Third Generation Partnership Project (3GPP) 38.300, the NG-RAN may also consist of a set of ng-eNBs, an ng-eNB may consist of an ng-eNB-CU and one or more ng-eNB-DU(s). An ng-eNB-CU and an ng-eNB-DU are connected via W1 interface. The general principles described herein also apply to ng-eNB and W1 interface, if not explicitly specified otherwise.

A gNB can support frequency division duplex (FDD) mode, time division duplex (TDD) mode or dual mode operation. An Xn interface interconnects gNBs.

A gNB may consist of a gNB-CU and one or more gNB-DU(s). A gNB-CU and a gNB-DU are connected via F1 interface. One gNB-DU is connected to only one gNB-CU.

For a network sharing with multiple cell ID broadcast, each Cell Identity associated with a subset of public land mobile networks (PLMNs) corresponds to a gNB-DU and the gNB-CU it is connected to, i.e., the corresponding gNB-DUs share the same physical layer cell resources. For resiliency, a gNB-DU may be connected to multiple gNB-CUs by appropriate implementation.

The NG, Xn and F1 are logical interfaces. For NG-RAN, the NG and Xn-C interfaces for a gNB consisting of a gNB-CU and gNB-DUs terminate in the gNB-CU. For EN-DC, the S1-U and X2-C interfaces for a gNB consisting of a gNB-CU and gNB-DUs terminate in the gNB-CU. The gNB-CU and connected gNB-DUs are only visible to other gNBs and the 5GC as a gNB.

The node hosting the user plane part of NR packet data convergence protocol (PDCP) (e.g., gNB-CU, gNB-CU-UP, and for EN-DC, MeNB or SgNB depending on the bearer split) shall perform user inactivity monitoring and further informs its inactivity or (re)activation to the node having C-plane connection towards the core network (e.g., over E1, X2). The node hosting NR radio link control (RLC) (e.g., gNB-DU) may perform user inactivity monitoring and further inform its inactivity or (re)activation to the node hosting control plane, e.g., gNB-CU or gNB-CU-CP.

Uplink PDCP configuration (i.e., how the UE uses the uplink at the assisting node) is indicated via X2-C (for EN-DC), Xn-C (for NG-RAN) and F1-C. Radio Link Outage/Resume for downlink and/or uplink is indicated via X2-U (for EN-DC), Xn-U (for NG-RAN) and F1-U.

The NG-RAN is layered into a radio network layer (RNL) and a transport network layer (TNL). The NG-RAN architecture, i.e., the NG-RAN logical nodes and interfaces between them, is defined as part of the RNL.

For each NG-RAN interface (NG, Xn, F1) the related TNL protocol and the functionality are specified. The TNL provides services for user plane transport and signaling transport.

In NG-Flex configuration, each NG-RAN node is connected to all access and mobility management functions (AMFs) of AMF sets within an AMF region supporting at least one slice also supported by the NG-RAN node. The AMF set and the AMF region are defined in 3GPP TS 23.501.

If security protection for control plane and user plane data on TNL of NG-RAN interfaces is supported, NDS/IP 3GPP TS 33.501 shall be applied.

FIG. 2 is a block diagram illustrating the architecture for gNB-CU-CP and gNB-CU-UP separation. A gNB may consist of a gNB-CU-CP, multiple gNB-CU-UPs and multiple gNB-DUs. The gNB-CU-CP is connected to the gNB-DU through the F1-C interface. The gNB-CU-UP is connected to the gNB-DU through the F1-U interface. The gNB-CU-UP is connected to the gNB-CU-CP through the E1 interface. One gNB-DU is connected to only one gNB-CU-CP. One gNB-CU-UP is connected to only one gNB-CU-CP. For resiliency, a gNB-DU and/or a gNB-CU-UP may be connected to multiple gNB-CU-CPs by appropriate implementation.

One gNB-DU can be connected to multiple gNB-CU-UPs under the control of the same gNB-CU-CP. One gNB-CU-UP can be connected to multiple DUs under the control of the same gNB-CU-CP.

The connectivity between a gNB-CU-UP and a gNB-DU is established by the gNB-CU-CP using bearer context management functions. The gNB-CU-CP selects the appropriate gNB-CU-UP(s) for the requested services for the UE. For multiple CU-Ups, they belong to same security domain as defined in TS 33.210.

Data forwarding between gNB-CU-UPs during intra-gNB-CU-CP handover within a gNB may be supported by Xn-U. F1-AP is specified in TS 38.473. E1 is specified in TS 38.463. Bearer context handling is supported over E1.

FIG. 3 is a flow diagram illustrating the procedure used to setup the bearer context in the gNB-CU-UP. At step 0, bearer context setup (e.g., following an SGNB ADDITION REQUEST message from the MeNB) is triggered in gNB-CU-CP.

At step 1, the gNB-CU-CP sends a BEARER CONTEXT SETUP REQUEST message containing uplink TNL address information for S1-U or NG-U, and if required, downlink TNL address information for X2-U or Xn-U to setup the bearer context in the gNB-CU-UP. For NG-RAN, the gNB-CU-CP decides flow-to-DRB mapping and sends the generated SDAP and PDCP configuration to the gNB-CU-UP.

At step 2, the gNB-CU-UP responds with a BEARER CONTEXT SETUP RESPONSE message containing the uplink TNL address information for F1-U, and downlink TNL address information for S1-U or NG-U, and if required, uplink TNL address information for X2-U or Xn-U. The indirect data transmission for split bearer through the gNB-CU-UP is not precluded.

At step 3, the F1 UE context setup procedure is performed to setup one or more bearers in the gNB-DU. At step 4, the gNB-CU-CP sends a BEARER CONTEXT MODIFICA-TION REQUEST message containing the downlink TNL address information for F1-U and PDCP status, and at step 5, the gNB-CU-UP responds with a BEARER CONTEXT MODIFICATION RESPONSE message.

FIG. 4 is a flow diagram illustrating the procedure used to release the bearer context in the gNB-CU-UP initiated by the gNB-CU-CP. At step 0, bearer context release (e.g., following an SGNB RELEASE REQUEST message from the MeNB) is triggered in gNB-CU-CP.

At step 1, the gNB-CU-CP sends a BEARER CONTEXT MODIFICATION REQUEST message to the gNB-CU-UP. At step 2, the gNB-CU-UP responds with a BEARER CONTEXT MODIFICATION RESPONSE carrying the PDCP uplink/downlink status.

At step 3, the F1 UE context modification procedure is performed to stop the data transmission for the UE. It is up to gNB-DU implementation when to stop the UE scheduling. Steps 1-3 are performed only if the PDCP status of the bearer(s) are to be preserved, e.g., for bearer type change.

At step 4, the gNB-CU-CP may receive the UE CON-TEXT RELEASE message from the MeNB in EN-DC operation.

At steps 5 and 7, a bearer context release procedure is performed. At step 6, the F1 UE context release procedure is performed to release the UE context in the gNB-DU.

FIG. 5 is a flow diagram illustrating the procedure used to release the bearer context in the gNB-CU-UP initiated by the gNB-CU-UP. At step 0, bearer context release is triggered in gNB-CU-UP, e.g., due to local failure.

At step 1, the gNB-CU-UP sends a BEARER CONTEXT RELEASE REQUEST message to request the release of the bearer context in the gNB-CU-UP. This message may contain the PDCP status.

At steps 2-5, if the PDCP status is to be preserved, the E1 Bearer Context Modification and the F1 UE Context Modi-fication procedures are performed. The E1 Bearer Context Modification procedure is used to convey data forwarding information to the gNB-CU-UP. The gNB-CU-CP may receive the UE Context Release from the MeNB.

At step 6, the gNB-CU-CP sends a BEARER CONTEXT RELEASE COMMAND message to release the bearer con-text in the gNB-CU-UP. At step 7, the gNB-CU-UP responds with a BEARER CONTEXT RELEASE COMPLETE to confirm the release of the bearer context including also data forwarding information.

At step 8, the F1 UE context release procedure may be performed to release the UE context in the gNB-DU.

Some relevant messages for bearer handling are shown below (taken from TS 38.463).

The BEARER CONTEXT SETUP REQUEST message is sent by the gNB-CU-CP to request the gNB-CU-UP to setup a bearer context.

Direction: gNB-CU-CP to gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| Security Information | M | | 9.3.1.10 | | YES | reject |
| UE DL Aggregate Maximum Bit Rate | M | | Bit Rate 9.3.1.20 | | YES | reject |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. | YES | reject |
| Serving PLMN | M | | PLMN Identity 9.3.1.7 | | YES | ignore |
| Activity Notification Level | M | | 9.3.1.67 | | YES | reject |
| UE Inactivity Timer | O | | Inactivity Timer 9.3.1.54 | Included if the Activity Notification Level is set to UE. | — | — |
| Bearer Context Status Change | O | | ENUMERATED (Suspend, Resume, . . .) | Indicates the status of the Bearer Context | YES | reject |

-continued

| | | | | | | |
|---|---|---|---|---|---|---|
| CHOICE System >E-UTRAN | M | | | | YES | reject |
| >>DRB To Setup List | M | | DRB To Setup List E-UTRAN 9.3.3.1 | | YES | reject |
| >>Subscriber Profile ID for RAT/Frequency priority | O | | 9.3.1.69 | | YES | ignore |
| >>Additional RRM Policy Index | O | | 9.3.1.70 | | YES | Ignore |
| >NG-RAN | | | | | | |
| >>PDU Session Resource To Setup List | M | | 9.3.3.2 | | YES | reject |
| RAN UE ID | O | | OCTET STRING (SIZE(8)) | | YES | ignore |
| gNB-DU ID | O | | 9.3.1.65 | Included whenever it is known by the gNB-CU-CP | YES | ignore |
| Trace Activation | O | | 9.3.1.68 | | YES | ignore |
| NPN Context Information | O | | 9.3.1.84 | | YES | reject |
| Management Based MDT PLMN List | O | | MDT PLMN List 9.3.1.89 | | YES | ignore |
| CHO Initiation | O | | ENUMERATED (True, . . .) | | YES | reject |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |

The BEARER CONTEXT SETUP RESPONSE message is sent by the gNB-CU-UP to confirm the setup of the requested bearer context.
Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| CHOICE System >E-UTRAN | M | | | | YES | reject |
| >>DRB Setup List | M | | DRB Setup List E-UTRAN 9.3.3.3 | | YES | reject |
| >>DRB Failed List | O | | DRB Failed List E-UTRAN 9.3.3.4 | | YES | reject |
| >NG-RAN | | | | | | |
| >>PDU Session Resource Setup List | M | | 9.3.3.5 | | YES | reject |
| >>PDU Session Resource Failed List | O | | 9.3.3.6 | | YES | reject |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |

The BEARER CONTEXT SETUP FAILURE message is sent by the gNB-CU-UP to indicate that the setup of the bearer context was unsuccessful.
Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | O | | 9.3.1.5 | | YES | ignore |
| Cause | M | | 9.3.1.2 | | YES | ignore |
| Criticality Diagnostics | O | | 9.3.1.3 | | YES | ignore |

The BEARER CONTEXT MODIFICATION REQUEST message is sent by the gNB-CU-CP to request the gNB-CU-UP to modify a bearer context.
Direction: gNB-CU-CP to gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| Security Information | O | | 9.3.1.10 | | YES | reject |
| UE DL Aggregate Maximum Bit Rate | O | | Bit Rate 9.3.1.20 | | YES | reject |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. | YES | reject |
| Bearer Context Status Change | O | | ENUMERATED (Suspend, Resume, . . .) | Indicates the status of the Bearer Context | YES | reject |
| New UL TNL Information Required | O | | ENUMERATED (required, . . .) | Indicates that new UL TNL information has been requested to be provided. | YES | reject |
| UE Inactivity Timer | O | | Inactivity Timer 9.3.1.54 | Included if the Activity Notification Level is set to UE | — | — |
| Data Discard Required | O | | ENUMERATED (required, . . . ) | Indicate to discard the DL user data in case of RAN paging failure. | YES | ignore |
| CHOICE System >E-UTRAN | O | | | | YES | reject |
| >>DRB To Setup List | O | | DRB To Setup Modification List E-UTRAN 9.3.3.7 | | YES | reject |
| >>DRB To Modify List | O | | DRB To Modify List E-UTRAN 9.3.3.8 | | YES | reject |
| >>DRB To Remove List | O | | DRB To Remove List E-UTRAN 9.3.3.9 | | YES | reject |

-continued

| | | | | | |
|---|---|---|---|---|---|
| >>Subscriber Profile ID for RAT/Frequency priority | O | | 9.3.1.69 | YES | ignore |
| >>Additional RRM Policy Index | O | | 9.3.1.70 | YES | ignore |
| >NG-RAN | | | | | |
| >>PDU Session Resource To Setup List | O | | PDU Session Resource To Setup Modification List 9.3.3.10 | YES | reject |
| >>PDU Session Resource To Modify List | O | | 9.3.3.11 | YES | reject |
| >>PDU Session Resource To Remove List | O | | 9.3.3.12 | YES | reject |
| RAN UE ID | O | | OCTET STRING (SIZE(8)) | YES | ignore |
| gNB-DU ID | O | | 9.3.1.65 | YES | ignore |
| Activity Notification Level | O | | 9.3.1.67 | YES | ignore |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |

The BEARER CONTEXT MODIFICATION RESPONSE message is sent by the gNB-CU-UP to confirm the modification of the requested bearer context.
Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| CHOICE System | O | | | | YES | ignore |
| >E-UTRAN | | | | | | |
| >>DRB Setup List | O | | DRB Setup Modification List E-UTRAN 9.3.3.13 | | YES | ignore |
| >>DRB Failed List | O | | DRB Failed Modification List E-UTRAN 9.3.3.14 | | YES | ignore |
| >>DRB Modified List | O | | DRB Modified List E-UTRAN 9.3.3.15 | | YES | ignore |
| >>DRB Failed To Modify List | O | | DRB Failed To Modify List E-UTRAN 9.3.3.16 | | YES | ignore |
| >>Retainability Measurements Information | O | | 9.3.1.71 | Provides information on all the removed DRB(s), needed for retainability measurements in the gNB-CU-CP | YES | ignore |
| >NG-RAN | | | | | | |
| >>PDU Session Resource Setup List | O | | PDU Session Resource Setup Modification | | YES | reject |

-continued

| | | | | | | |
|---|---|---|---|---|---|---|
| | | | List 9.3.3.17 | | | |
| >>PDU Session Resource Failed List | O | | PDU Session Resource Failed Modification List 9.3.3.18 | | YES | reject |
| >>PDU Session Resource Modified List | O | | 9.3.3.19 | | YES | reject |
| >>PDU Session Resource Failed To Modify List | O | | 9.3.3.20 | | YES | reject |
| >>Retainability Measurements Information | O | | 9.3.1.71 | Provides information on all the removed DRB(s), needed for retainability measurements in the gNB-CU-CP | YES | ignore |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |

The BEARER CONTEXT MODIFICATION FAILURE message is sent by the gNB-CU-UP to indicate that the modification of the bearer context was unsuccessful.
Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CPUE E1AP ID | M | | 9.3.1.4 | | YES | reject |
| gNB-CU-UP UE E1AP ID | M | | 9.3.1.5 | | YES | reject |
| Cause | M | | 9.3.1.2 | | YES | ignore |
| Criticality Diagnostics | O | | 9.3.1.3 | | YES | ignore |

The BEARER CONTEXT MODIFICATION REQUIRED message is sent by the gNB-CU-UP to inform the gNB-CU-CP that a modification of a bearer context is required (e.g., due to local problems at the gNB-CU-UP).
Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| CHOICE System >E-UTRAN | M | | | | YES | reject |
| >>DRB To Modify List | O | | DRB Required To Modify List E-UTRAN 9.3.3.21 | | YES | reject |
| >>DRB To Remove List | O | | DRB Required To Remove List 9.3.3.22 | | YES | reject |

-continued

| | | | IE type and reference | | Criticality | Assigned Criticality |
|---|---|---|---|---|---|---|
| >NG-RAN | | | | | | |
| >>PDU Session Resource To Modify List | O | | PDU Session Resource Required To Modify List 9.3.3.23 | | YES | reject |
| >>PDU Session Resource To Remove List | O | | 9.3.3.12 | | YES | reject |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |

The BEARER CONTEXT MODIFICATION CONFIRM message is sent by the gNB-CU-CP to confirm the modification of the requested bearer context.
Direction: gNB-CU-CP to gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| CHOICE System | O | | | | YES | ignore |
| >E-UTRAN | | | | | | |
| >>DRB Modified List | O | | DRB Confirm Modified List E-UTRAN 9.3.3.24 | | YES | ignore |
| >NG-RAN | | | | | | |
| >>PDU Session Resource Modified List | O | | PDU Session Resource Confirm Modified List 9.3.3.25 | | YES | Ignore |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |

The BEARER CONTEXT RELEASE COMMAND message is sent by the gNB-CU-CP to command the gNB-CU-UP to release an UE-associated logical E1 connection.
Direction: gNB-CU-CP to gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| Cause | M | | 9.3.1.2 | | YES | ignore |

The BEARER CONTEXT RELEASE COMPLETE message is sent by the gNB-CU-UP to confirm the release of the UE-associated logical E1 connection.

Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| Criticality Diagnostics | O | | 9.3.1.3 | | YES | ignore |
| Retainability Measurements Information | O | | 9.3.1.71 | Provides information on all the removed DRB(s) and QOS Flow(s), needed for retainability measurements in the gNB-CU-CP | YES | ignore |

The BEARER CONTEXT RELEASE REQUEST message is sent by the gNB-CU-UP to request the release of an UE-associated logical E1 connection.
Direction: gNB-CU-UP to gNB-CU-CP and indicates to stop the data transmission for the UE. The source gNB-DU also sends a Downlink Data Delivery Status frame to inform the gNB-CU about the unsuccessfully transmitted downlink data to the UE.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| DRB Status List | | 0 . . . 1 | | | YES | ignore |
| >DRB Status Item | | 1 . . . <maxnoofDRBs> | | | — | — |
| >>DRB ID | M | | 9.3.1.16 | | — | — |
| >>PDCP DL Count | O | | PDCP Count 9.3.1.35 | PDCP count for next DL packet to be assigned. | — | — |
| >>PDCP UL Count | O | | PDCP Count 9.3.1.35 | PDCP count for first un-acknowledged UL packet. | — | — |
| Cause | M | | 9.3.1.2 | | YES | ignore |

| Range bound | Explanation |
|---|---|
| maxnoofDRBs | Maximum no. of DRBs for a UE. Value is 32. |

The Inter-gNB-DU mobility procedure is used when a UE moves from one gNB-DU to another gNB-DU within the same gNB-CU during NR operation.

FIG. 6 is a flow diagram illustrating the inter-gNB-DU mobility procedure for intra-NR. At step 1, the UE sends a MeasurementReport message to the source gNB-DU. At step 2, the source gNB-DU sends an uplink RRC MESSAGE TRANSFER message to the gNB-CU to convey the received MeasurementReport message.

At step 3, the gNB-CU sends an UE CONTEXT SETUP REQUEST message to the target gNB-DU to create a UE context and setup one or more data bearers. The UE CONTEXT SETUP REQUEST message includes a HandoverPreparationInformation. At step 4, the target gNB-DU responds to the gNB-CU with an UE CONTEXT SETUP RESPONSE message.

At step 5, the gNB-CU sends a UE CONTEXT MODIFICATION REQUEST message to the source gNB-DU, which includes a generated RRCReconfiguration message At step 6, the source gNB-DU forwards the received RRCReconfiguration message to the UE. At step 7, the source gNB-DU responds to the gNB-CU with the UE CONTEXT MODIFICATION RESPONSE message.

At step 8, a Random Access procedure is performed at the target gNB-DU. The target gNB-DU sends a Downlink Data Delivery Status frame to inform the gNB-CU. Downlink packets, which may include PDCP PDUs not successfully transmitted in the source gNB-DU, are sent from the gNB-CU to the target gNB-DU. It is up to gNB-CU implementation whether to start sending downlink User Data to gNB-DU before or after reception of the Downlink Data Delivery Status.

At step 9, the UE responds to the target gNB-DU with an RRCReconfigurationComplete message. At step 10, the target gNB-DU sends an uplink RRC MESSAGE TRANSFER message to the gNB-CU to convey the received RRCReconfigurationComplete message. Downlink packets are sent to the UE. Also, uplink packets are sent from the UE, which are forwarded to the gNB-CU through the target gNB-DU.

At step 11, the gNB-CU sends a UE CONTEXT RELEASE COMMAND message to the source gNB-DU. At step 12, the source gNB-DU releases the UE context and responds the gNB-CU with an UE CONTEXT RELEASE COMPLETE message.

FIG. 7 is a flow diagram illustrating the procedure used for inter-gNB handover involving gNB-CU-UP change. Overall inter-gNB handover procedure is specified in TS 37.340.

At step 1, the source gNB-CU-CP sends HANDOVER REQUEST message to the target gNB-CU-CP. At steps 2-4, the bearer context setup procedure is performed as described in Section 8.9.2.

At step 5, the target gNB-CU-CP responds the source gNB-CU-CP with a HANDOVER REQUEST ACKNOWL-EDGE message.

At step 6, the F1 UE Context Modification procedure is performed to stop uplink data transmission at the gNB-DU and to send the handover command to the UE.

At steps 7-8, the bearer context modification procedure (gNB-CU-CP initiated) is performed to enable the gNB-CU-CP to retrieve the PDCP uplink/downlink status and to exchange data forwarding information for the bearer.

A step 9, the source gNB-CU-CP sends an SN STATUS TRANSFER message to the target gNB-CU-CP.

At steps 10-11, the bearer context modification procedure is performed.

At step 12, data forwarding may be performed from the source gNB-CU-UP to the target gNB-CU-UP.

At steps 13-15, the path switch procedure is performed to update the downlink TNL address information for the NG-U towards the core network.

At step 16, the target gNB-CU-CP sends a UE CONTEXT RELEASE message to the source gNB-CU-CP.

At steps 17 and 19, the bearer context release procedure is performed.

At step 18, the F1 UE context release procedure is performed to release the UE context in the source gNB-DU.

NR also includes integrated access and backhaul (IAB) networks. 3GPP is currently standardizing integrated access and wireless access backhaul in NR (IAB) in Rel-16. The usage of short range mmWave spectrum in NR creates a need for densified deployment with multi-hop backhauling. However, optical fiber to every base station is too costly and sometimes not even possible (e.g., historical sites). The main IAB principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) (e.g., to residential/office buildings). The larger bandwidth available for NR in mmWave spectrum provides opportunity for self-backhauling, without limiting the spectrum to be used for the access links. On top of that, the inherent multi-beam and MIMO support in NR reduce cross-link interference between backhaul and access links allowing higher densification.

During the study item phase of the IAB work (summary of the study item can be found in the technical report TR 38.874), it has been agreed to adopt a solution that leverages the Central Unit (CU)/Distributed Unit (DU) split architecture of NR, where the IAB node hosts a DU part that is controlled by a central unit. The IAB nodes also have a Mobile Termination (MT) part that they use to communicate with their parent nodes.

The specifications for IAB reuses some existing functions and interfaces defined in NR. In particular, MT, gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The Mobile-Termination (MT) function has been defined as a component of the IAB node. MT is referred to as a function residing on an IAB-node that terminates the radio interface layers of the backhaul Uu interface toward the IAB-donor or other IAB-nodes.

FIG. 8 is a block diagram illustrating a reference diagram for IAB-architectures (TR 38.874). The illustrated example includes IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

The baseline user plane and control plane protocol stacks for IAB are shown in FIGS. 9 and 10, respectively. As illustrated in FIGS. 9 and 10, the chosen protocol stacks reuse the current CU-DU split specification in rel-15, where the full user plane F1-U (GTP-U/UDP/JP) is terminated at the IAB node (like a normal DU) and the full control plane F1-C(F1-AP/SCTP/IP) is also terminated at the IAB node (like a normal DU). In the above cases, Network Domain Security (NDS) has been employed to protect both UP and CP traffic (IPsec in the case of UP, and DTLS in the case of CP). IPsec could also be used for the CP protection instead of DTLS (in this case no DTLS layer is used).

A new protocol layer referred to as the Backhaul Adaptation Protocol (BAP) is introduced in the IAB nodes and the IAB donor, which is used for routing of packets to the appropriate downstream/upstream node and also mapping the UE bearer data to the proper backhaul radio link control (RLC) channel (and also between ingress and egress backhaul RLC channels in intermediate IAB nodes) to satisfy the end to end QoS requirements of bearers.

FIG. 11 shows an example of some possible IAB-node migration cases listed in the order of complexity and more details as follows.

Intra-CU Case (A): In this case the IAB-node (e) along with it serving UEs is moved to a new parent node (IAB-node (b)) under the same donor-DU (1). The successful intra-donor DU migration requires establishing UE context setup for the IAB-node (e) MT in the DU of the new parent node (IAB-node (b)), updating routing tables of IAB nodes along the path to IAB-node (e) and allocating resources on the new path. The IP address for IAB-node (e) will not change, while the F1-U tunnel/connection between donor-CU (1) and IAB-node (e) DU will be redirected through IAB-node (b).

Intra-CU Case (B): The procedural requirements/complexity of this case is the same as that of Case (A). Also, because the new IAB-donor DU (i.e., DU2) is connected to the same L2 network, the IAB-node (e) can use the same IP address under the new donor DU. However, the new donor DU (i.e., DU2) will need to inform the network using IAB-node (e) L2 address to get/keep the same IP address for IAB-node (e) by employing a mechanism such as Address Resolution Protocol (ARP).

Intra-CU Case (C): This case is more complex than Case (A) because it also needs allocation of new IP address for IAB-node (e). If IPsec is used for securing the F1-U tunnel/connection between the Donor-CU (1) and IAB-node (e) DU, then it might be possible to use existing IP address along the path segment between the Donor-CU (1) and SeGW, and new IP address for the IPsec tunnel between SeGW and IAB-node (e) DU.

Inter-CU Case (D): This is the most complicated case in terms of procedural requirements and may needs new specification procedures that are beyond the scope of 3GPP Rel-16.

Note that 3GPP Rel-16 has standardized procedure only for intra-CU migration, which is described below.

During the intra-CU topology adaptation, both the source and the target parent node are served by the same IAB-donor-CU. The target parent node may use a different IAB-donor-DU than the source parent node. The source path may further have common nodes with the target path.

FIG. 12 is a flow diagram illustrating an example of the topology adaptation procedure, where the target parent node uses a different IAB-donor-DU than the source parent node. At step 1, the migrating IAB-MT sends a Measurement Report message to the source parent node gNB-DU. This report is based on a Measurement Configuration the migrating IAB-MT received from the IAB-donor-CU before.

At step 2, the source parent node gNB-DU sends an UL RRC MESSAGE TRANSFER message to the IAB-donor-CU to convey the received Measurement Report.

At step 3, the IAB-donor-CU sends a UE CONTEXT SETUP REQUEST message to the target parent node gNB-DU to create the UE context for the migrating IAB-MT and setup one or more bearers. The bearers are used by the migrating IAB-MT for its own data and signaling traffic.

At step 4, the target parent node gNB-DU responds to the IAB-donor-CU with a UE CONTEXT SETUP RESPONSE message.

At step 5, the IAB-donor-CU sends a UE CONTEXT MODIFICATION REQUEST message to the source parent node gNB-DU, which includes a generated RRCReconfiguration message. The Transmission Action Indicator in the UE CONTEXT MODIFICATION REQUEST message indicates to stop the data transmission to the migrating IAB-node.

At step 6, the source parent node gNB-DU forwards the received RRCReconfiguration message to the migrating IAB-MT. At step 7, the source parent node gNB-DU responds to the IAB-donor-CU with the UE CONTEXT MODIFICATION RESPONSE message.

At step 8, a Random Access procedure is performed at the target parent node gNB-DU.

At step 9, the migrating IAB-MT responds to the target parent node gNB-DU with an RRCReconfigurationComplete message.

At step 10, the target parent node gNB-DU sends an UL RRC MESSAGE TRANSFER message to the IAB-donor-CU to convey the received RRCReconfigurationComplete message. Also, uplink packets may be sent from the migrating IAB-MT, which are forwarded to the IAB-donor-CU through the target parent node gNB-DU. These downlink and uplink packets belong to the MT's own signaling and data traffic.

At step 11, the IAB-donor-CU configures BH RLC channels and BAP-layer route entries on the target path between migrating IAB-node and target IAB-donor-DU. This step also includes allocation of TNL address(es) that is (are) routable via the target IAB-donor-DU. These configurations may be performed at an earlier stage, e.g., after step 3. The new TNL address(es) is (are) included in the RRCReconfiguration message at step 5.

At step 12, all F1-U tunnels and F1-C are switched to use the migrating IAB-node's new TNL address(es).

At step 13, the IAB-donor-CU sends a UE CONTEXT RELEASE COMMAND message to the source parent node gNB-DU.

At step 14, the source parent node gNB-DU releases the migrating IAB-MT's context and responds the IAB-donor-CU with a UE CONTEXT RELEASE COMPLETE message.

At step 15, the IAB-donor-CU releases BH RLC channels and BAP routing entries on the source path. The migrating IAB-node may further release the TNL address(es) it used on the source path.

When the source route and target route have common nodes, the BH RLC channels and BAP routing entries of those nodes may not need to be released in Step 15. Steps 11, 12 and also have to be performed for the migrating IAB-node's descendant nodes, as follows.

The descendant nodes must also switch to new TNL addresses that are anchored in the target IAB-donor-DU. The IAB-donor-CU may send these addresses to the descendant nodes and release the old addresses via corresponding RRC signaling.

If needed, the IAB-donor-CU configures BH RLC channels, BAP-layer route entries on the target path for the descendant nodes and the BH RLC Channel mappings on the descendant nodes in the same manner as described for the migrating IAB-node in step 11.

The descendant nodes switch their F1-U and F1-C tunnels to new TNL addresses that are anchored at the new IAB-donor-DU, in the same manner as described for the migrating IAB-node in step 12.

Based on implementation, these steps can be performed after or in parallel with the handover of the migrating IAB-node. In Rel-16, in-flight packets in the uplink direction that were dropped during the migration procedure may not be recoverable.

In the upstream direction, in-flight packets between the source parent node and the IAB-donor-CU can be delivered even after the target path is established. On-going downlink data in the source path may be discarded up to implementation. IAB-donor-CU can determine the unsuccessfully transmitted downlink data over the backhaul link by implementation.

SUMMARY

Based on the description above, there currently exist certain challenges for E1 signaling for group handover. For example, as described above, Third Generation Partnership Project (3GPP) Rel-16 has only standardized the integrated access and backhaul (IAB) intra-CU migration procedure. Considering that inter-CU migration will be an important feature of IAB Rel-17, certain enhancements to existing UE handover and IAB intra-CU migration procedure are required for reducing service interruption (due to IAB-node migration) and signaling load.

To perform the handover in an optimized way, a group handover procedure is proposed. For example, the Xn/X2 handover request/handover request ACK messages may be modified (or new messages introduced) for performing the group handover of an IAB node and all the UEs/IAB nodes that the IAB node is directly/indirectly serving.

In some deployments, in addition to the CU/DU split, the CU may be further split into a CU-UP and CU-CP. With current E1 specification, bearer contexts are set up/modified/released via UE associated procedures and thus, the group handover procedure proposed for IAB nodes will be impacted (i.e., group relocation done over X2/Xn, but then individual signaling required for relocating the bearer context of each IAB-MT/UE).

Even in scenarios where an inter-CU migration of an IAB node is involved, the network may want to perform load balancing among the CU-UPs that are associated with the same CU-CP. Currently, such relocation is only possible at an individual UE/IAB level.

Certain aspects of the present disclosure and their embodiments may provide solutions to these or other challenges. For example, particular embodiments include signaling enhancements between the CU-CP and CU-UP to enable a group handover of an IAB node and all the UEs/IAB nodes that are directly/indirectly being served by the IAB node during inter-CU migration.

In some embodiments, the IAB node may not be involved in the inter-CU handover, but the CU-UP that is serving the IAB node and all the UEs/IAB nodes (being directly/indirectly being served by the IAB node) is changed while keeping the same CU-CP (e.g., for load balancing at the CU-UPs).

Some embodiments include non-IAB scenarios when there is a need to relocate the bearer contexts of a multitude of UEs from one CU-UP to another, e.g., for load balancing at the CU-UPs.

According to some embodiments, a method for use in a network node for performing a group handover comprises receiving an indication to perform a bearer context operation on a plurality of bearer contexts and performing the indicated bearer context operation on the plurality of bearer contexts.

In particular embodiments, the indication incudes a list identifying the plurality of bearer contexts. In some embodiments, the indication includes a group identifier identifying the plurality of bearer contexts. The indication may further comprise a list identifying bearer contexts to exclude from the plurality of bearer contexts identified by the group identifier. In some embodiments, the indication comprises an identifier of an IAB node and the plurality of bearer contexts comprise bearer contexts associated with the IAB node (e.g., UEs and IAB MTs).

In particular embodiments, the network node comprises a source network node and the bearer context operation comprises at least one of a bearer context modification request and a bearer context release request. In some embodiments, the network node comprises a target network node and the bearer context operation comprises at least one of a bearer context modification request and a bearer context setup request.

In particular embodiments, the network node comprises a CU-UP, and the network node receives the indication from a CU-CP.

In particular embodiments, the plurality of bearer contexts are associated with at least one of a user equipment and an integrated access and backhaul (IAB) node mobile termination (MT).

According to some embodiments, a method for use in a first network node for performing a group handover comprises transmitting an indication to a second network node to perform a bearer context operation on a plurality of bearer contexts and receiving an indication of a result of the bearer context operation from the second network node.

In particular embodiments, the second network node comprises a source network node and the bearer context operation comprises at least one of a bearer context modification request and a bearer context release request. In some embodiments, the second network node comprises a target network node and the bearer context operation comprises at least one of a bearer context modification request and a bearer context setup request.

In particular embodiments, the first network node comprises a CU-CP, and the second network node comprises a CU-UP.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, without the signaling enhancements of particular embodiments, a change of CU-UP of an IAB node (either during inter-CU migration or for load balancing purposes), several UE associated bearer context setup/release procedures have to be initiated over the E1 interface (i.e., corresponding to each concerned IAB node and UE involved in the group CU-UP relocation).

Thus, by performing the relocation of the affected UE/IAB-MT bearer contexts over the E1 interface as a group, particular embodiments prevent the signaling storm that could have resulted from one-by-one handling of each UE/IAB-MT. Apart from the signaling storm over the E1 interface, performing the group relocation also reduces the overall latency incurred in the handover/relocation, thereby reducing/preventing the interruption of data transmission/reception of end user data.

BRIEF DESCRIPTION OF THE DRAWINGS

For a more complete understanding of the disclosed embodiments and their features and advantages, reference is now made to the following description, taken in conjunction with the accompanying drawings, in which:

FIG. 22 is a flowchart illustrating another method implemented in a communication system, according to certain embodiments; and FIG. 23 is a flowchart illustrating another method implemented in a communication system, according to certain embodiments.

DETAILED DESCRIPTION

Figure 1:
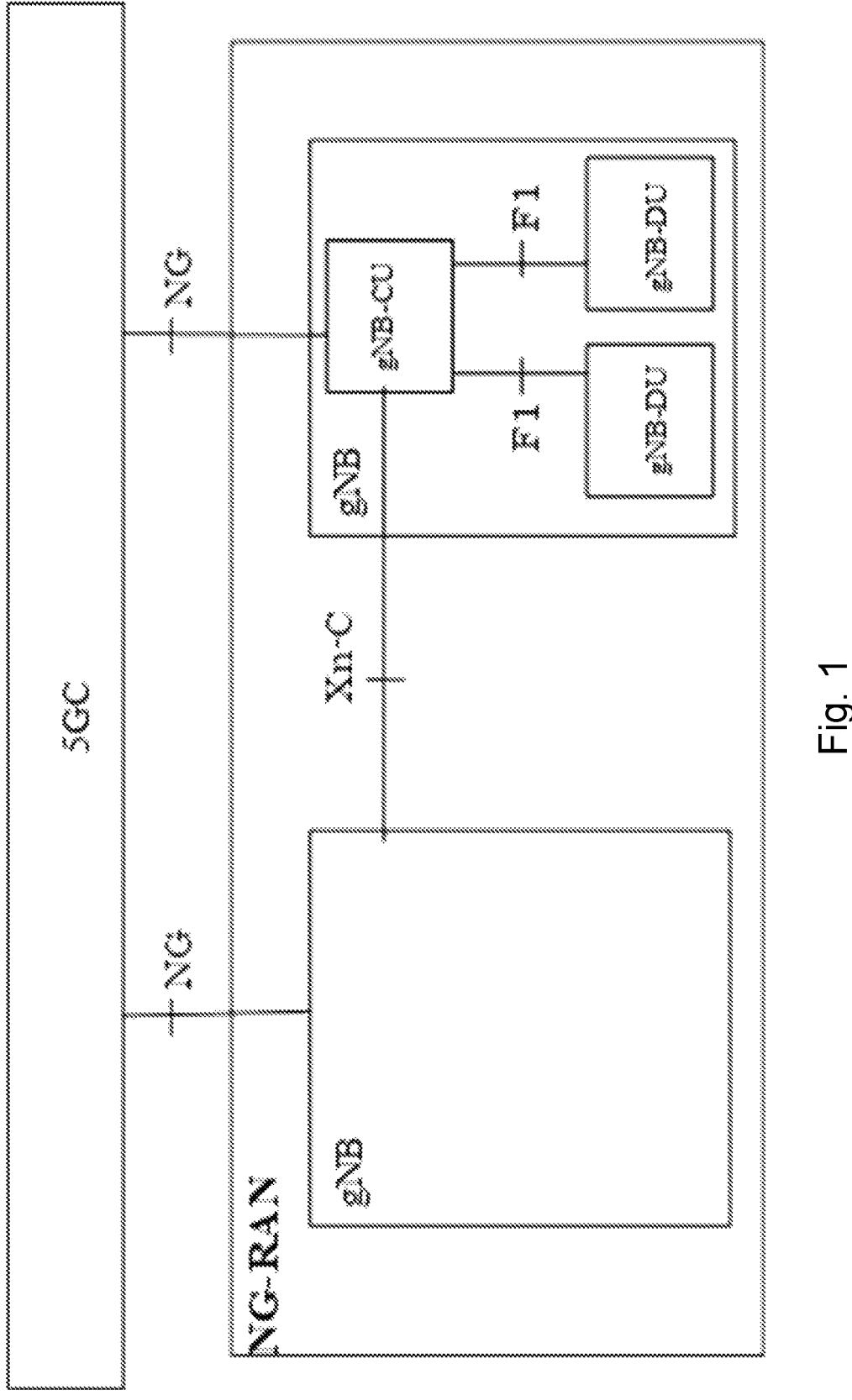
FIG. 1 illustrates the current next generation radio access network (NG-RAN)
Figure 2:
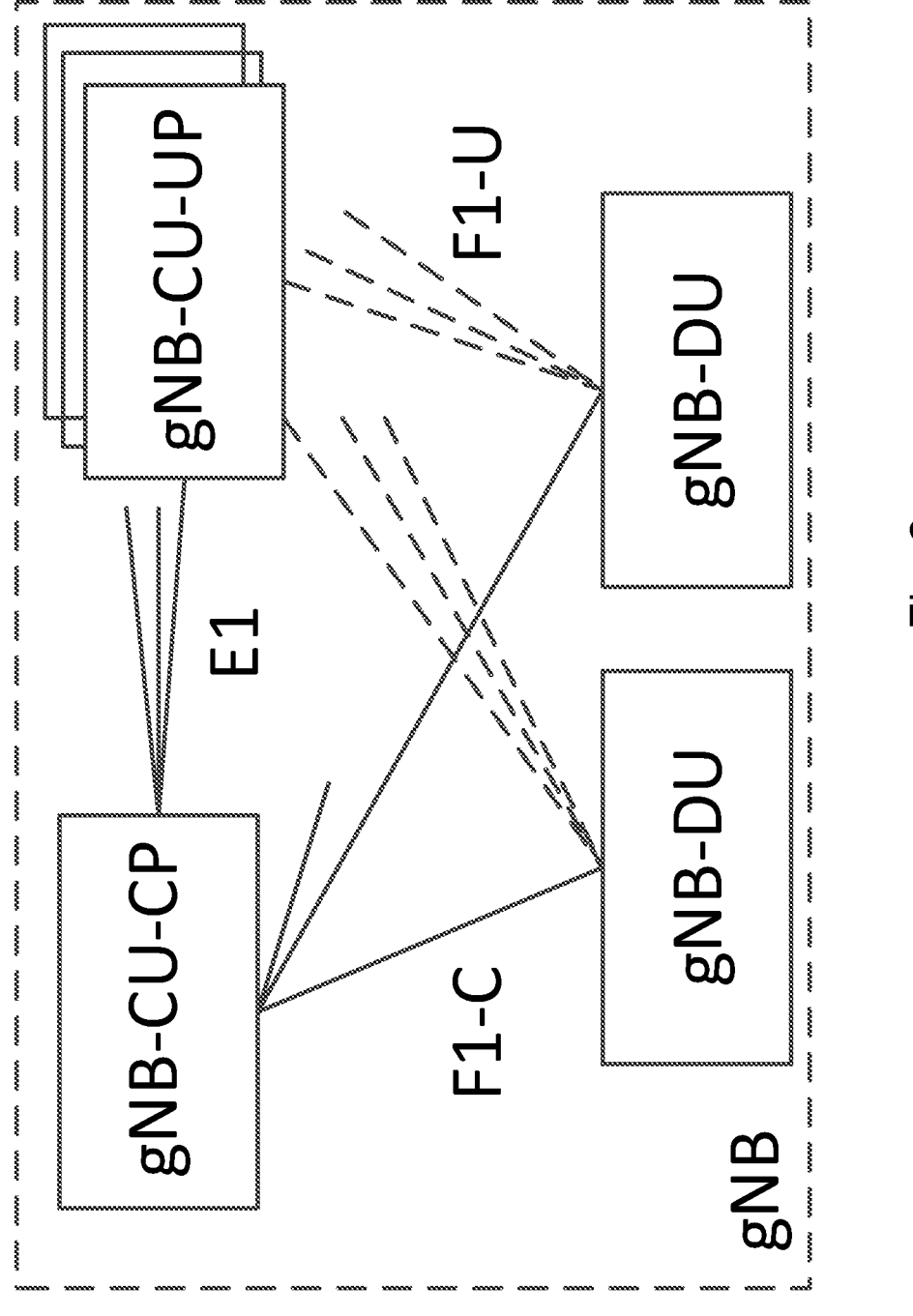
FIG. 2 is a block diagram illustrating the architecture for gNB-CU-CP and gNB-CU-UP separation.
Figure 3:
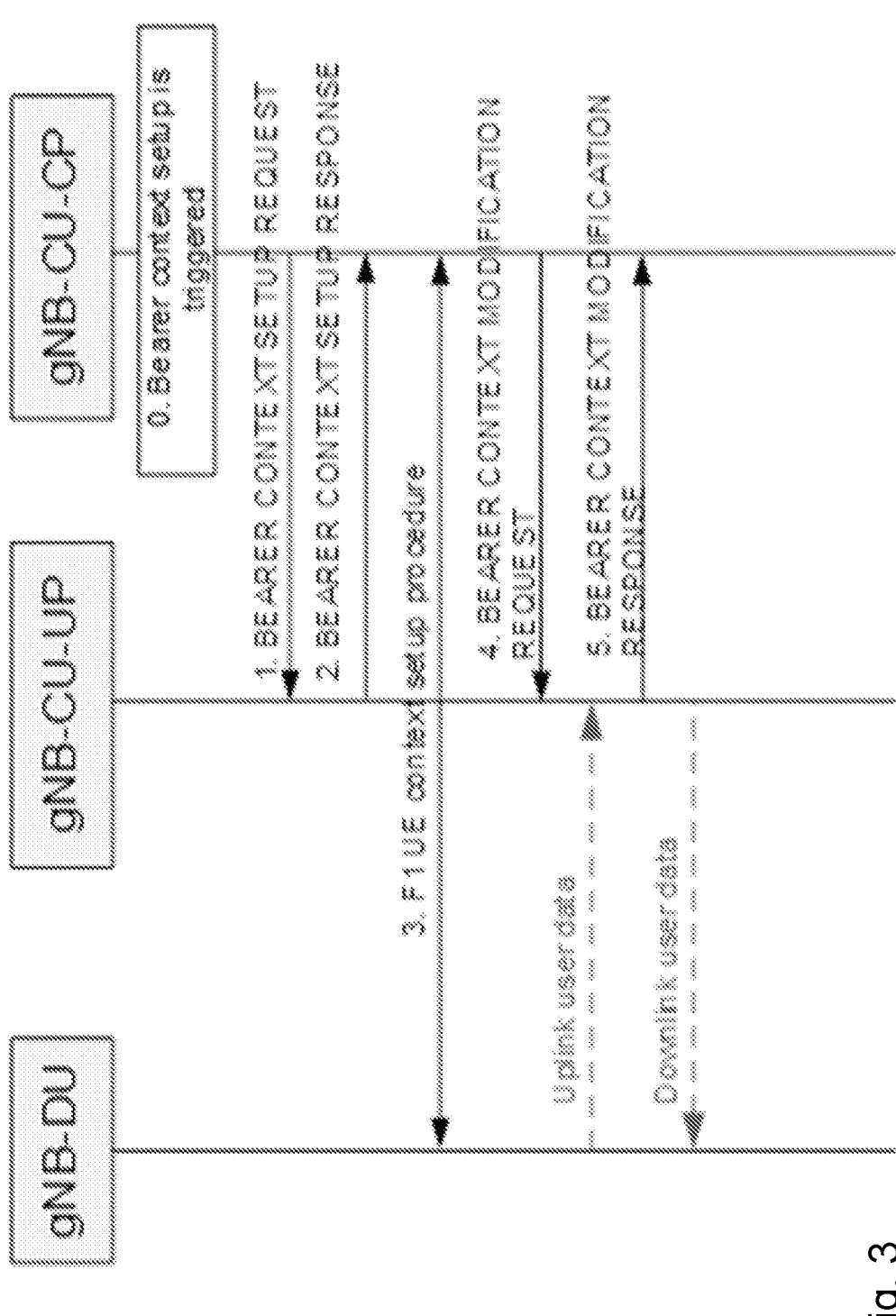
FIG. 3 is a flow diagram illustrating the procedure used to setup the bearer context in the gNB-CU-UP.
Figure 4:
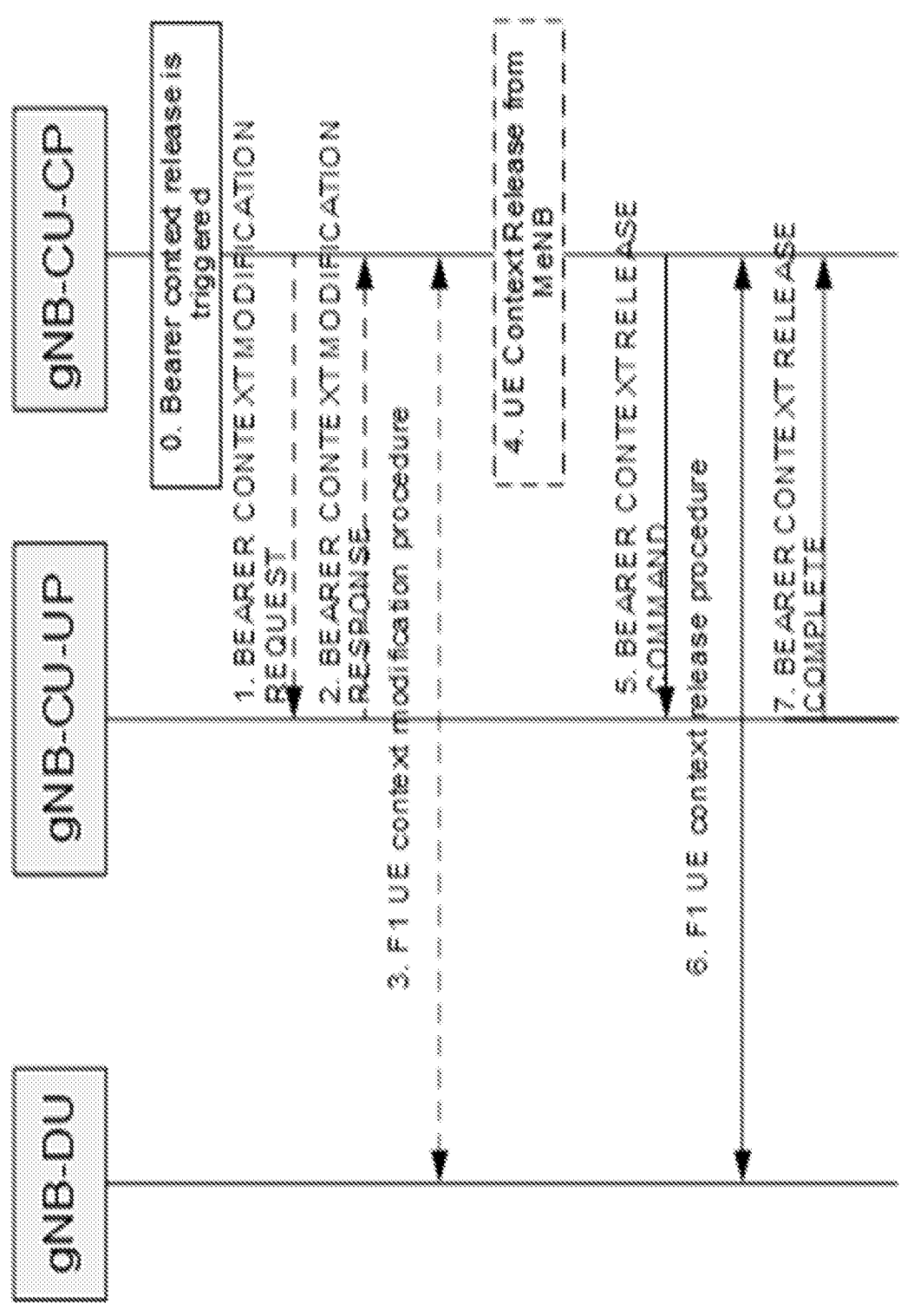
FIG. 4 is a flow diagram illustrating the procedure used to release the bearer context in the gNB-CU-UP initiated by the gNB-CU-CP.
Figure 5:
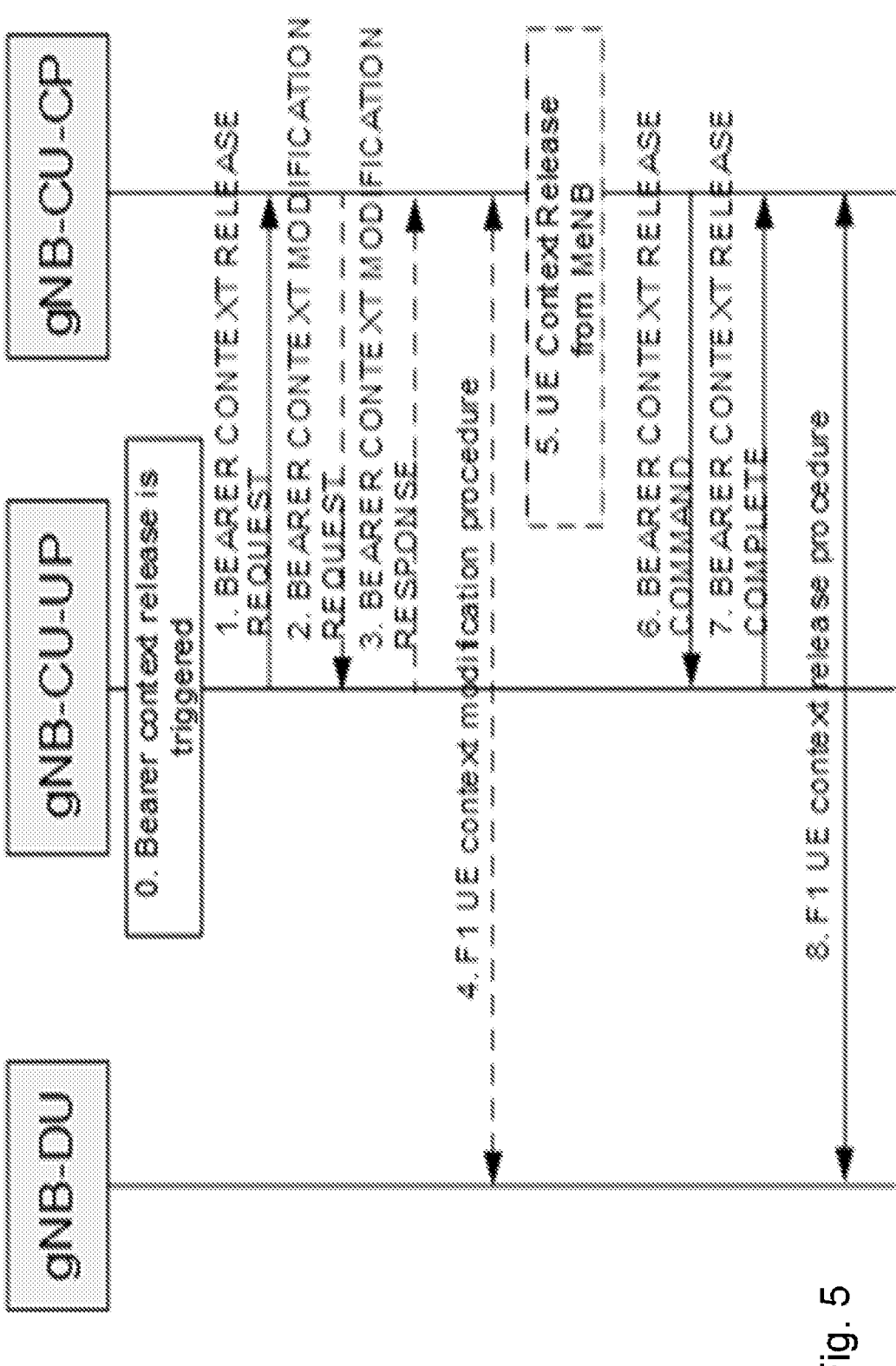
FIG. 5 is a flow diagram illustrating the procedure used to release the bearer context in the gNB-CU-UP initiated by the gNB-CU-UP.
Figure 6:
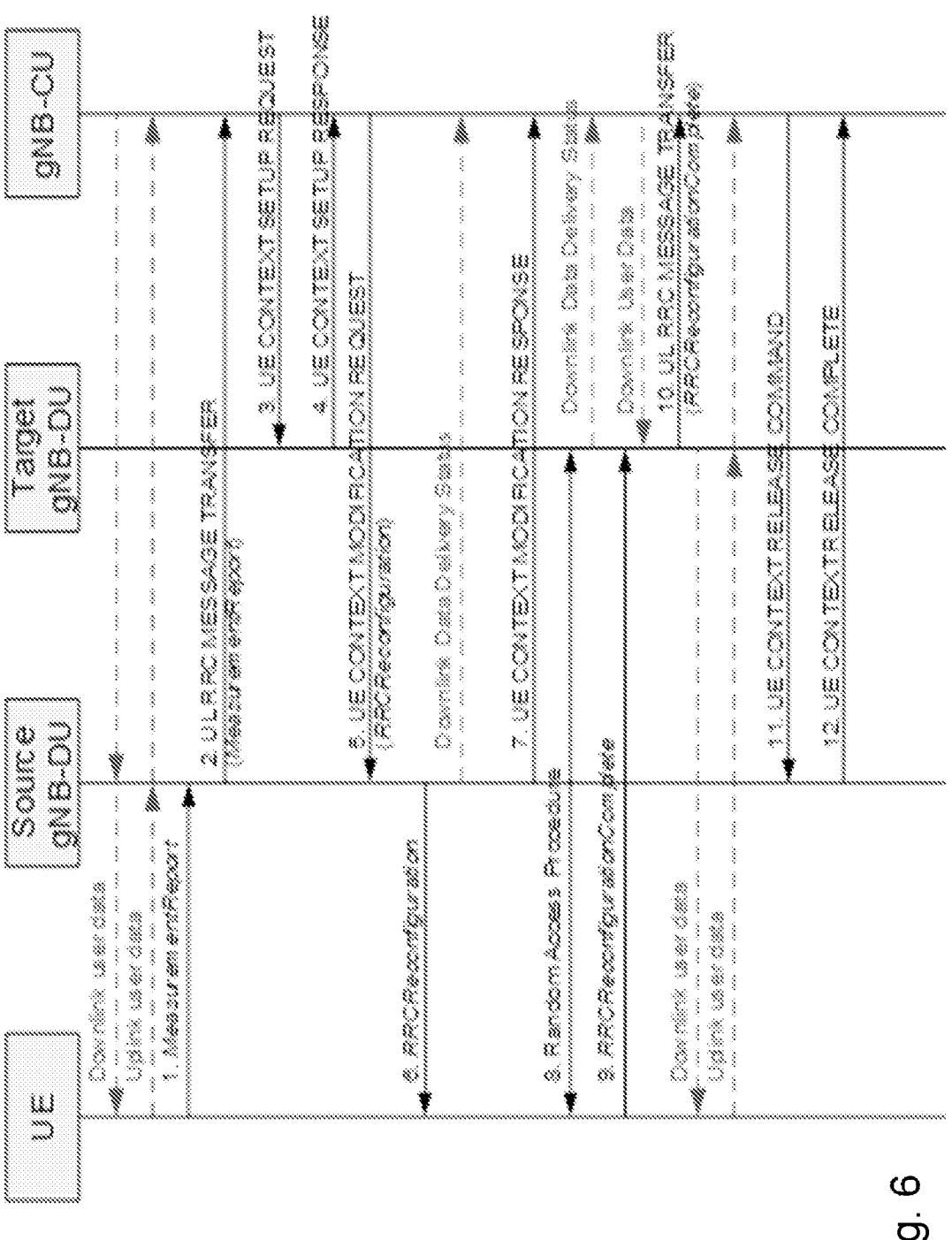
FIG. 6 is a flow diagram illustrating the inter-gNB-DU mobility procedure for intra-NR.
Figure 7:
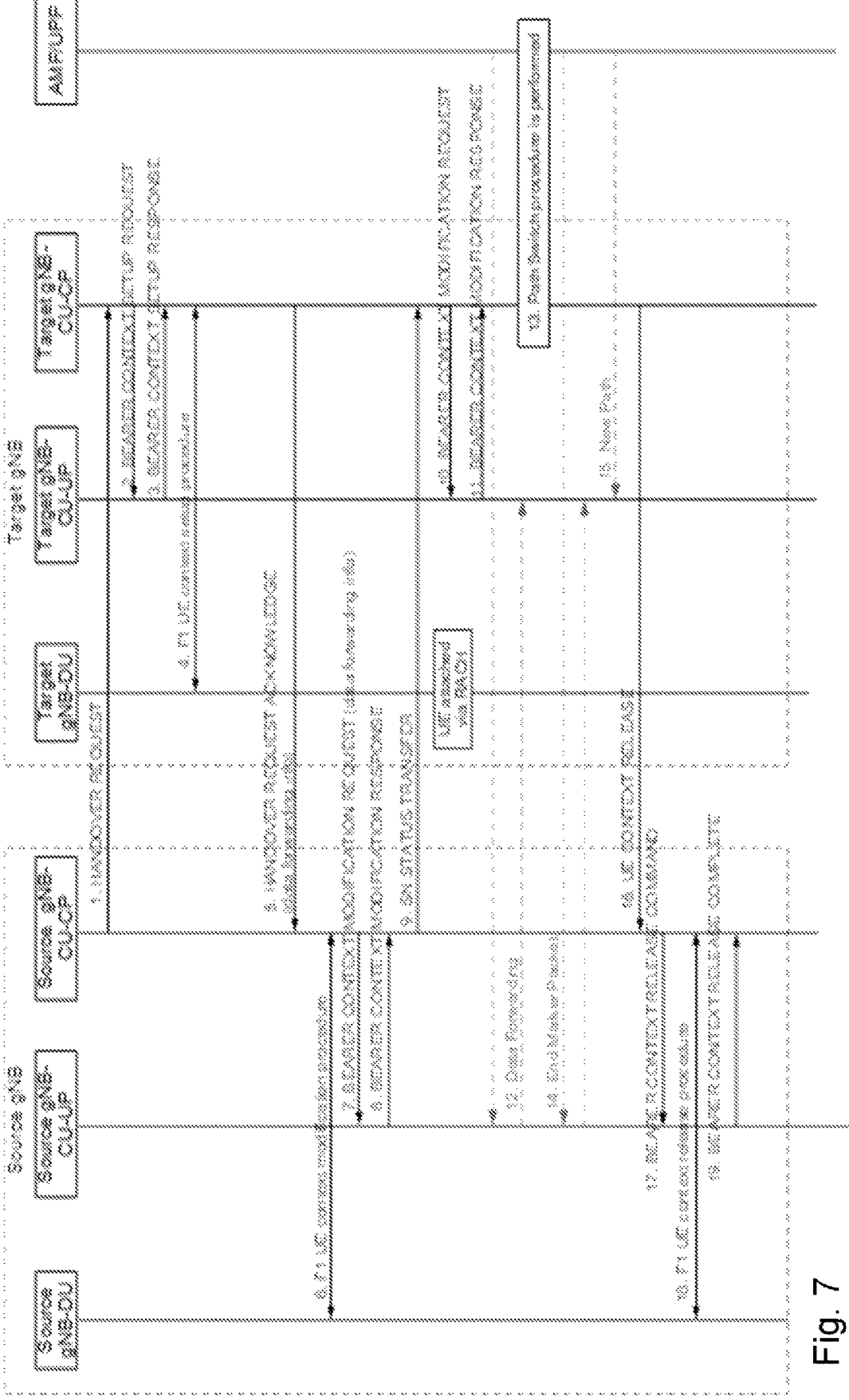
FIG. 7 is a flow diagram illustrating the procedure used for inter-gNB handover involving gNB-CU-UP change.
Figure 8:
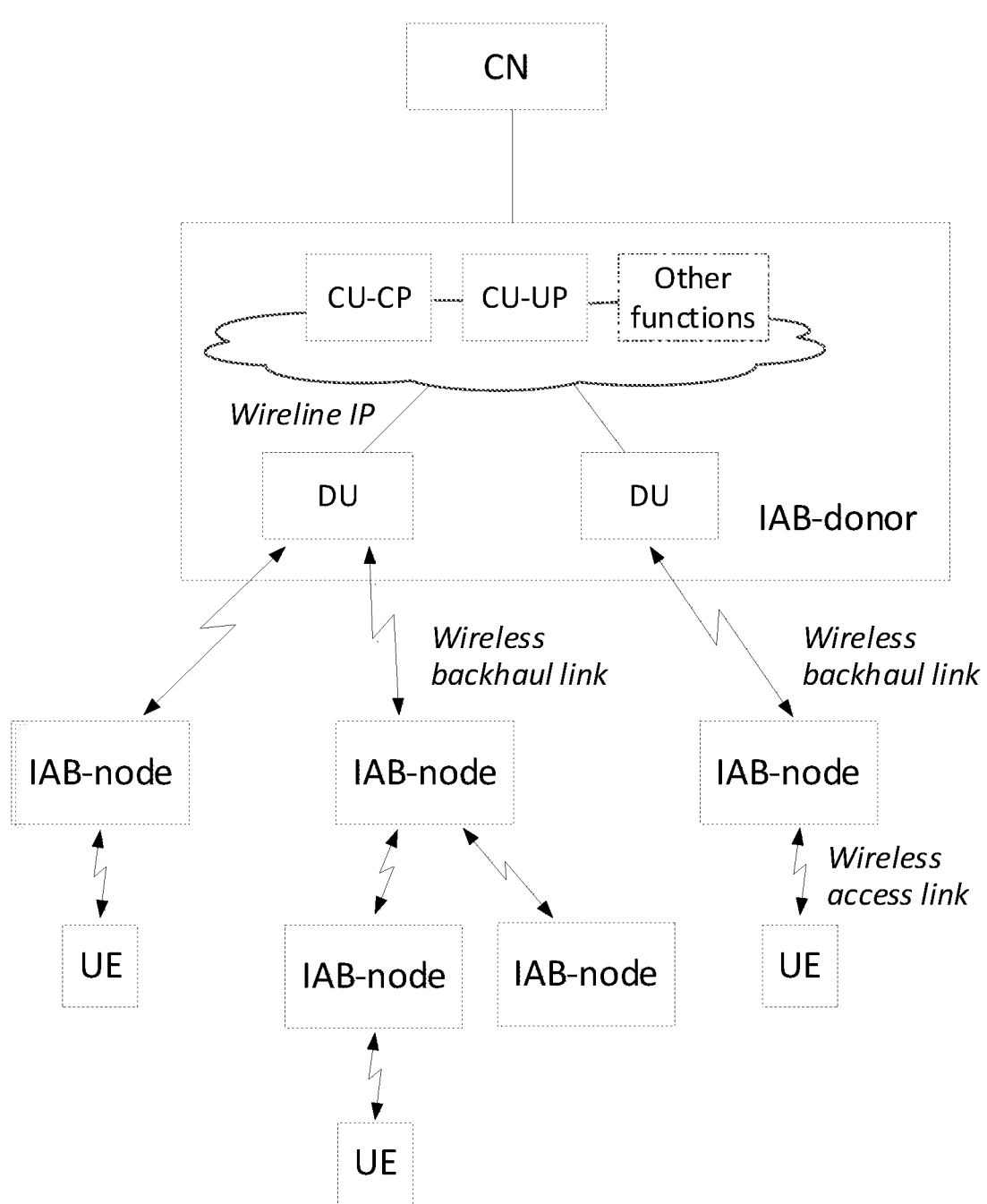
FIG. 8 is a block diagram illustrating a reference diagram for IAB-architectures.
Figure 9:
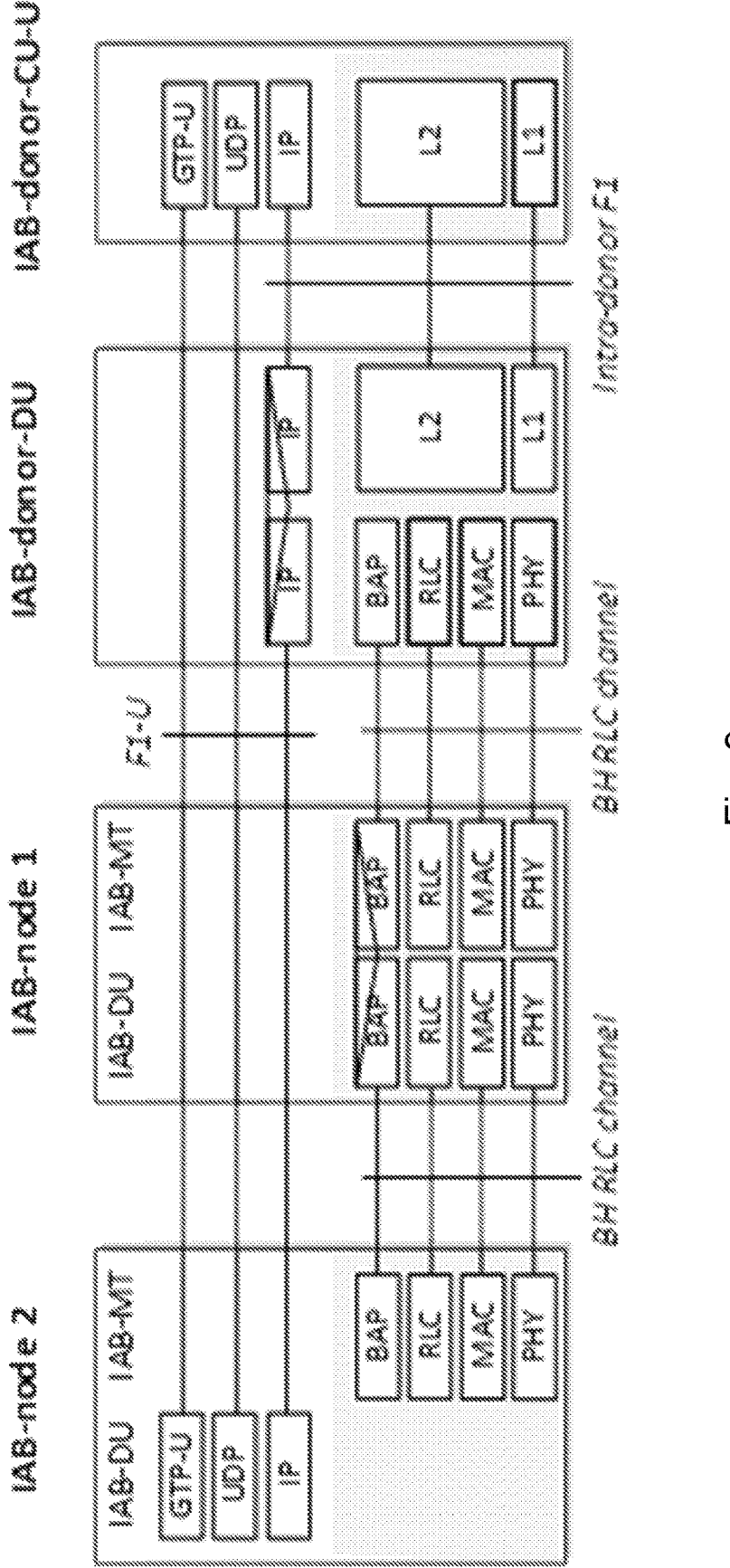
FIG. 9 illustrates a baseline user plane protocol stack for IAB.
Figure 10:
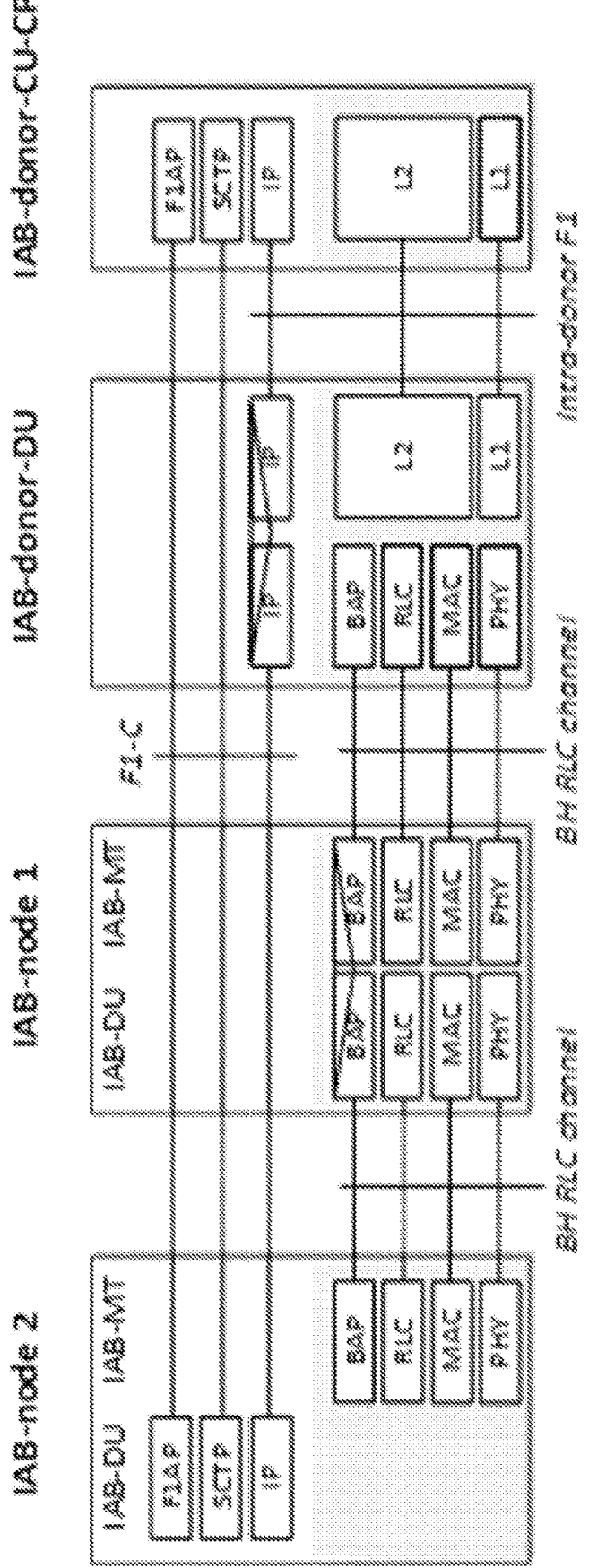
FIG. 10 illustrates a baseline control plane protocol stack for IAB.
Figure 11:
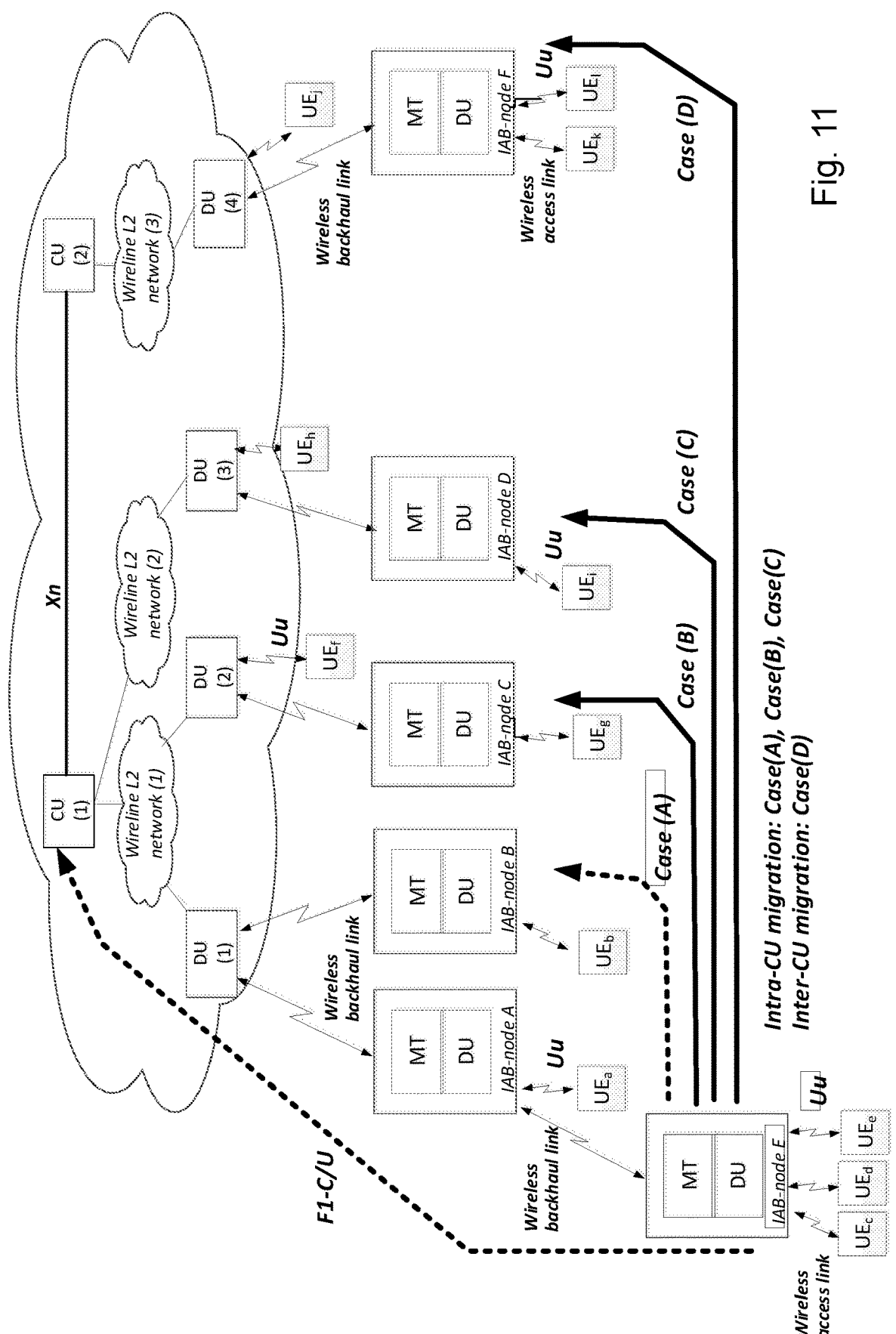
FIG. 11 illustrates an example of possible IAB-node migration cases listed in the order of complexity.
Figure 12:
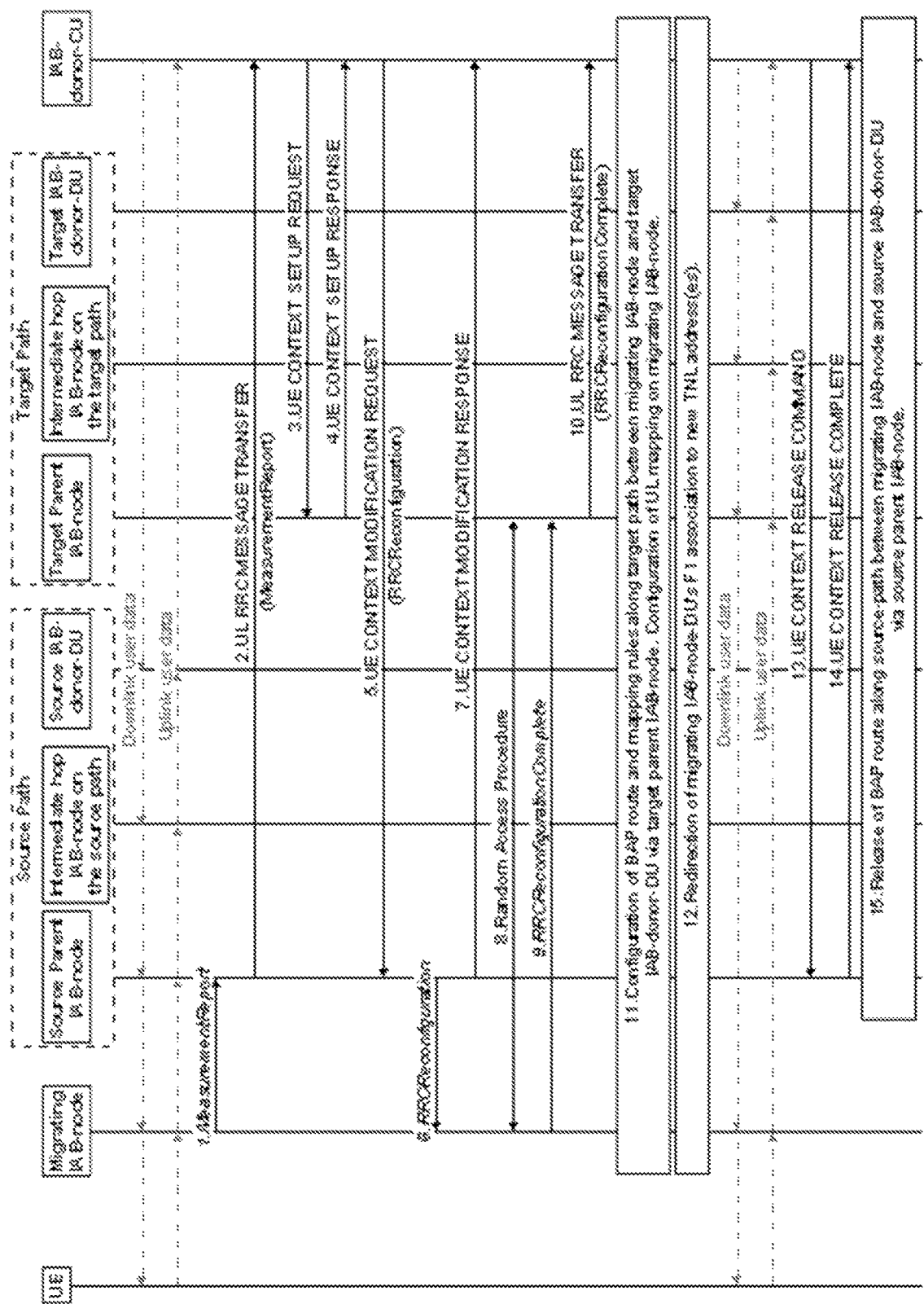
FIG. 12 is a flow diagram illustrating an example of the topology adaptation procedure, where the target parent node uses a different IAB-donor-DU than the source parent node.

Based on the description above, there currently exist certain challenges for E1 signaling for group handover. For example, as described above, Third Generation Partnership Project (3GPP) Rel-16 has only standardized the integrated access and backhaul (IAB) intra-CU migration procedure. Considering that inter-CU migration will be an important feature of IAB Rel-17, certain enhancements to existing user equipment (UE) handover and IAB intra-CU migration procedure are required for reducing service interruption (due to IAB-node migration) and signaling load.

To perform the handover in an optimized way, a group handover procedure is proposed. For example, the Xn/X2 handover request/handover request ACK messages may be modified (or new messages introduced) for performing the group handover of an IAB node and all the UEs/IAB nodes that the IAB node is directly/indirectly serving.

In some deployments, in addition to the central unit (CU)/distributed unit (DU) split, the CU may be further split into a CU user pane (CU-UP) and CU control plane (CU- CP). With current E1 specification, bearer contexts are set up/modified/released via UE associated procedures and thus, the group handover procedure proposed for IAB nodes will be impacted (i.e., group relocation done over X2/Xn, but then individual signaling required for relocating the bearer context of each IAB-MT/UE).

Even in scenarios where an inter-CU migration of an IAB node is involved, the network may want to perform load balancing among the CU-UPs that are associated with the same CU-CP. Currently, such relocation is only possible at an individual UE/IAB level.

Certain aspects of the present disclosure and their embodiments may provide solutions to these or other challenges. For example, particular embodiments include signaling enhancements between the CU-CP and CU-UP to enable a group handover of an IAB node and all the UEs/IAB nodes that are directly/indirectly being served by the IAB node during inter-CU migration.

In some embodiments, the IAB node may not be involved in the inter-CU handover, but the CU-UP that is serving the IAB node and all the UEs/IAB nodes (being directly/indirectly being served by the IAB node) is changed while keeping the same CU-CP (e.g., for load balancing at the CU-UPs).

Some embodiments include non-IAB scenarios when there is a need to relocate the bearer contexts of a multitude of UEs from one CU-UP to another, e.g., for load balancing at the CU-UPs.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

As used herein, the term "a UE/IAB node directly served by an IAB node" refers to a UE/IAB node that is directly connected to the IAB node. The term "a UE/IAB node is indirectly served by an IAB node" means that the IAB node is an ancestor node to an IAB node that is currently serving the UE or IAB node. Particular embodiments are described with respect to an example using next generation (NG) radio access network (RAN) (i.e., gNB CP-UP split), but the embodiments are equally applicable to the eNB CP-UP split as well.

According to some embodiments, signaling enhancements over the E1 interface between the CU-CP and CU-UP enable group relocation of bearer contexts concerning more than one UE and/or IAB-MT. Particular embodiments include the following non-UE associated E1-AP bearer context handling messages:

GROUP BEARER CONTEXT SETUP REQUEST
GROUP BEARER CONTEXT SETUP RESPONSE
GROUP BEARER CONTEXT SETUP FAILURE
GROUP BEARER CONTEXT RELEASE COMMAND
GROUP BEARER CONTEXT RELEASE COMPLETE
GROUP BEARER CONTEXT RELEASE REQUEST
GROUP BEARER CONTEXT MODIFICATION REQUEST
GROUP BEARER CONTEXT MODIFICATION RESPONSE
GROUP BEARER CONTEXT MODIFICATION FAILURE

Example implementations of the messages are given below (these are non-limiting examples). Note that the corresponding legacy messages do not have the "GROUP"

in the name. The message names are examples, and particular implementations may include other names for the described functionality. Other embodiments may enhance the legacy messages to support the group bearer context handling.

In the current specifications, the UE IDs on, e.g., F1 and E1 interfaces are also used to identify the IAB-MTs on these interfaces. With respect to the embodiments described herein, the same applies, meaning that all the messages included by particular embodiments are equally applicable to both UEs and IAB-MTs (i.e., to their bearers).

In the RELEASE and FAILURE messages below, the Cause and Criticality Diagnostics IEs are shown on the message level, meaning that they pertain to all the UEs and/or IAB-MTs addressed by the message. Alternatively, these IEs may be on a per-UE level, meaning that each item of the list would have its own instance of these two IEs.

The GROUP BEARER CONTEXT SETUP REQUEST message is sent by the gNB-CU-CP to request the gNB-CU-UP to set up bearer context of a multitude of UEs/IAB-MTs.

Direction: gNB-CU-CP to gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| UE Bearer context Info List | | 1 | | | YES | reject |
| >UE Bearer context Info List Item | | 1 . . . <maxnoofUEs> | | | EACH | reject |
| >>gNB-CU-CP UE E1AP ID | M | | 9.3.1.4 | | YES | reject |
| >>Security Information | M | | 9.3.1.10 | | YES | reject |
| >>UE DL Aggregate Maximum Bit Rate | M | | Bit Rate 9.3.1.20 | | YES | reject |
| >>UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. | YES | reject |
| >>Serving PLMN | M | | PLMN Identity 9.3.1.7 | | YES | ignore |
| >>Activity Notification Level | M | | 9.3.1.67 | | YES | reject |
| >>UE Inactivity Timer | O | | Inactivity Timer 9.3.1.54 | Included if the Activity Notification Level is set to UE. | — | — |
| >>Bearer Context Status Change | O | | ENUMERATED (Suspend, Resume, . . .) | Indicates the status of the Bearer Context | YES | reject |
| >>CHOICE System | M | | | | YES | reject |
| >>>E-UTRAN | | | | | | |
| >>>>DRB To Setup List | M | | DRB To Setup List E-UTRAN 9.3.3.1 | | YES | reject |
| >>>>Subscriber Profile ID for RAT/Frequency priority | O | | 9.3.1.69 | | YES | ignore |
| >>>>Additional RRM Policy Index | O | | 9.3.1.70 | | YES | Ignore |
| >>>NG-RAN | | | | | | |
| >>>>PDU Session Resource To Setup List | M | | 9.3.3.2 | | YES | reject |

-continued

| | | | | | | |
|---|---|---|---|---|---|---|
| >>RAN UE ID | O | | OCTET STRING (SIZE(8)) | | YES | ignore |
| >>gNB-DU ID | O | | 9.3.1.65 | Included whenever it is known by the gNB-CU-CP | YES | ignore |
| >>Trace Activation | O | | 9.3.1.68 | | YES | ignore |
| >>NPN Context Information | O | | 9.3.1.84 | | YES | reject |
| >>Management Based MDT PLMN List | O | | MDT PLMN List 9.3.1.89 | | YES | ignore |
| >>CHO Initiation | O | | ENUMERATED (True, . . .) | | YES | reject |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |
| maxnoofUEs | Maximum no. of UEs that can be involved in a group bearer context setup. Value is 1024. |

The GROUP BEARER CONTEXT SETUP RESPONSE [25] message is sent by the gNB-CU-UP to confirm the setup of the requested bearer context setup of a multitude of UEs/IAB-MTs.

Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| UE Bearer context Info List | | 1 | | | YES | reject |
| >UE Bearer context Info List Item | | 1 . . . <maxnoofUEs> | | | EACH | reject |
| >>gNB-CU-CP UE E1AP ID | M | | 9.3.1.4 | | YES | reject |
| >>gNB-CU-UP UE E1AP ID | M | | 9.3.1.5 | | YES | reject |
| >>CHOICE System | M | | | | YES | reject |
| >>>E-UTRAN | | | | | | |
| >>>>DRB Setup List | M | | DRB Setup List E-UTRAN 9.3.3.3 | | YES | reject |
| >>>>DRB Failed List | O | | DRB Failed List E-UTRAN 9.3.3.4 | | YES | reject |
| >>>NG-RAN | | | | | | |
| >>>>PDU Session Resource Setup List | M | | 9.3.3.5 | | YES | reject |
| >>>>PDU Session Resource Failed List | O | | 9.3.3.6 | | YES | reject |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |
| maxnoofUEs | Maximum no. of UEs that can be involved in a group bearer context setup. |

The GROUP BEARER CONTEXT SETUP FAILURE message is sent by the gNB-CU-UP to indicate that the setup of the bearer context of a multitude of UEs/IAB-MTs was unsuccessful.
Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| UE Bearer context Info List | | 1 | | | YES | reject |
| >UE Bearer context Info List Item | | 1 . . . <maxnoofUEs> | | | EACH | reject |
| >>gNB-CU-CP UE E1AP ID | M | | 9.3.1.4 | | YES | reject |
| >>gNB-CU-UP UE E1AP ID | O | | 9.3.1.5 | | YES | ignore |
| Cause | M | | 9.3.1.2 | | YES | ignore |
| Criticality Diagnostics | O | | 9.3.1.3 | | YES | ignore |

| Range bound | Explanation |
|---|---|
| maxnoofUEs | Maximum no. of UEs that can be involved in a group bearer context setup. |

The GROUP BEARER CONTEXT MODIFICATION REQUEST message is sent by the gNB-CU-CP to request the gNB-CU-UP to modify bearer contexts for a multitude of UEs/IAB-MTs.
Direction: gNB-CU-CP to gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| UE Bearer context Info List | | 1 | | | YES | reject |
| >UE Bearer context Info List Item | | 1 . . . <maxnoofUEs> | | | EACH | reject |
| >>gNB-CU-CP UE E1AP ID | M | | 9.3.1.4 | | YES | reject |
| >>gNB-CU-UP UE E1AP ID | M | | 9.3.1.5 | | YES | reject |
| >>Security Information | O | | 9.3.1.10 | | YES | reject |
| >>UE DL Aggregate Maximum Bit Rate | O | | Bit Rate 9.3.1.20 | | YES | reject |
| >>UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. | YES | reject |
| >>Bearer Context Status Change | O | | ENUMERATED (Suspend, Resume, . . . ) | Indicates the status of the Bearer Context | YES | reject |
| >>New UL TNL Information Required | O | | ENUMERATED (required, . . . ) | Indicates that new UL TNL information has been requested to be provided. | YES | reject |
| >>UE Inactivity Timer | O | | Inactivity Timer 9.3.1.54 | Included if the Activity Notification Level is set to UE. | — | — |
| >>Data Discard Required | O | | ENUMERATED (required, . . . ) | Indicate to discard the DL user data in case of RAN paging failure. | YES | ignore |
| >>CHOICE System | O | | | | YES | reject |
| >>>E-UTRAN | | | | | | |
| >>>>DRB To Setup List | O | | DRB To Setup Modification | | YES | reject |

-continued

| IE/Group Name | Presence | Range | IE type and reference | Criticality | Assigned Criticality |
|---|---|---|---|---|---|
| | | | List E-UTRAN 9.3.3.7 | | |
| >>>>DRB To Modify List | O | | DRB To Modify List E-UTRAN 9.3.3.8 | YES | reject |
| >>>>DRB To Remove List | O | | DRB To Remove List E-UTRAN 9.3.3.9 | YES | reject |
| >>>>Subscriber Profile ID for RAT/Frequency priority | O | | 9.3.1.69 | YES | ignore |
| >>>>Additional RRM Policy Index | O | | 9.3.1.70 | YES | ignore |
| >>>NG-RAN | | | | | |
| >>>>PDU Session Resource To Setup List | O | | PDU Session Resource To Setup Modification List 9.3.3.10 | YES | reject |
| >>>>PDU Session Resource To Modify List | O | | 9.3.3.11 | YES | reject |
| >>>>PDU Session Resource To Remove List | O | | 9.3.3.12 | YES | reject |
| >>RAN UE ID | O | | OCTET STRING (SIZE(8)) | YES | ignore |
| >>gNB-DU ID | O | | 9.3.1.65 | YES | ignore |
| >>Activity Notification Level | O | | 9.3.1.67 | YES | ignore |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |
| maxnoofUEs | Maximum no. of UEs that can be involved in a group bearer context setup. |

The GROUP BEARER CONTEXT MODIFICATION RESPONSE message is sent by the gNB-CU-UP to confirm the modification of the requested bearer contexts for a multitude of UEs/IAB-MTs.
Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| UE Bearer context Info List | | 1 | | | YES | reject |
| >UE Bearer context Info List Item | | 1 . . . <maxnoofUEs> | | | EACH | reject |
| >>gNB-CU-CP UE E1AP ID | M | | 9.3.1.4 | | YES | reject |
| >>gNB-CU-UP UE E1AP ID | M | | 9.3.1.5 | | YES | reject |
| >>CHOICE System | O | | | | YES | ignore |
| >>>E-UTRAN | | | | | | |
| >>>>DRB Setup List | O | | DRB Setup Modification List E-UTRAN 9.3.3.13 | | YES | ignore |

-continued

| >>>>DRB Failed List | O | | DRB Failed Modification List E-UTRAN 9.3.3.14 | | YES | ignore |
| >>>>DRB Modified List | O | | DRB Modified List E-UTRAN 9.3.3.15 | | YES | ignore |
| >>>>DRB Failed To Modify List | O | | DRB Failed To Modify List E-UTRAN 9.3.3.16 | | YES | ignore |
| >>>>Retainability Measurements Information | O | | 9.3.1.71 | Provides information on all the removed DRB(s), needed for retainability measurements in the gNB-CU-CP | YES | ignore |
| >>>NG-RAN | | | | | | |
| >>>>PDU Session Resource Setup List | O | | PDU Session Resource Setup Modification List 9.3.3.17 | | YES | reject |
| >>>>PDU Session Resource Failed List | O | | PDU Session Resource Failed Modification List 9.3.3.18 | | YES | reject |
| >>>>PDU Session Resource Modified List | O | | 9.3.3.19 | | YES | reject |
| >>>>PDU Session Resource Failed To Modify List | O | | 9.3.3.20 | | YES | reject |
| >>>>Retainability Measurements Information | O | | 9.3.1.71 | Provides information on all the removed DRB(s), needed for retainability measurements in the gNB-CU-CP | YES | ignore |

| Range bound | Explanation |
| --- | --- |
| maxnoofDRBs | Maximum no. of DRBs for a UE. Value is 32. |
| maxnoofPDUSessionResource | Maximum no. of PDU Sessions for a UE. Value is 256. |
| maxnoofUEs | Maximum no. of UEs that can be involved in a group bearer context setup. |

The GROUP BEARER CONTEXT MODIFICATION FAILURE message is sent by the gNB-CU-UP to indicate that the modification of the bearer contexts for a multitude of UEs/IAB-MTs was unsuccessful.
Direction: gNB-CU-UP to gNB-CU-CP

| IE/Group Name | Presence | Range | IE type and reference | Semantics description | Criticality | Assigned Criticality |
| --- | --- | --- | --- | --- | --- | --- |
| Message Type | M | | 9.3.1.1 | | YES | reject |
| UE Bearer context Info List | | 1 | | | YES | reject |
| >UE Bearer context Info List Item | | 1 . . . <maxnoofUEs> | | | EACH | reject |
| >>gNB-CU-CP UE E1AP ID | M | | 9.3.1.4 | | YES | reject |

-continued

| >>gNB-CU-UP UE E1AP ID | M | | 9.3.1.5 | | YES | reject |
| Cause | M | | 9.3.1.2 | | YES | ignore |
| Criticality Diagnostics | O | | 9.3.1.3 | | YES | ignore |

| Range bound | Explanation |
| --- | --- |
| maxnoofUEs | Maximum no. of UEs that can be involved in a group bearer context setup. |

The GROUP BEARER CONTEXT RELEASE COMMAND message is sent by the gNB-CU-CP to command the gNB-CU-UP to release a multitude of UE/IAB-MT-associated logical E1 connections.
Direction: gNB-CU-CP to gNB-CU-UP

| IE/Group Name | Presence | Range | IE type and reference | Semantics description | Criticality | Assigned Criticality |
| --- | --- | --- | --- | --- | --- | --- |
| Message Type | M | | 9.3.1.1 | | YES | reject |
| UE Bearer context Info List | | 1 | | | YES | reject |
| >UE Bearer context Info List Item | | 1 . . . <maxnoofUEs> | | | EACH | reject |
| >>gNB-CU-CP UE E1AP ID | M | | 9.3.1.4 | | YES | reject |
| >>gNB-CU-UP UE E1AP ID | M | | 9.3.1.5 | | YES | reject |
| Cause | M | | 9.3.1.2 | | YES | ignore |

| Range bound | Explanation |
| --- | --- |
| maxnoofUEs | Maximum no. of UEs that can be involved in a group bearer context setup. |

35

The GROUP BEARER CONTEXT RELEASE COMPLETE message is sent by the gNB-CU-UP to confirm the release of a multitude of UE-associated logical E1 connections for a multitude of UEs/IAB-MTs.
Direction: gNB-CU-UP to gNB-CU-CP

| IE/Group Name | Presence | Range | IE type and reference | Semantics description | Criticality | Assigned Criticality |
| --- | --- | --- | --- | --- | --- | --- |
| Message Type | M | | 9.3.1.1 | | YES | reject |
| UE Bearer context Info List | | 1 | | | YES | reject |
| >UE Bearer context Info List Item | | 1 . . . <maxnoofUEs> | | | EACH | reject |
| >>gNB-CU-CP UE E1AP ID | M | | 9.3.1.4 | | YES | reject |
| >>gNB-CU-UP UE E1AP ID | M | | 9.3.1.5 | | YES | reject |
| >>Retainability Measurements Information | O | | 9.3.1.71 | Provides information on all the removed DRB(s) and QOS Flow(s), needed for retainability measurements in the gNB-CU-CP | YES | Ignore |
| Criticality Diagnostics | O | | 9.3.1.3 | | YES | ignore |

-continued

| Range bound | Explanation |
|---|---|
| maxnoofUEs | Maximum no. of UEs that can be involved in a group bearer context setup. |

The GROUP BEARER CONTEXT RELEASE REQUEST message is sent by the gNB-CU-UP to request the release of a multitude of UE-associated logical E1 connections for a multitude of UEs/IAB-MTs.
Direction: gNB-CU-UP to gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| UE Bearer context Info List | | 1 | | | YES | reject |
| >UE Bearer context Info List Item | | 1 . . . <maxnoofUES> | | | EACH | reject |
| >>gNB-CU-CP UE E1AP ID | M | | 9.3.1.4 | | YES | reject |
| >>gNB-CU-UP UE E1AP ID | M | | 9.3.1.5 | | YES | reject |
| >>DRB Status List | | 0 . . . 1 | | | YES | ignore |
| >>>DRB Status Item | | 1 . . . <maxnoofDRBs> | | | — | — |
| >>>>DRB ID | M | | 9.3.1.16 | | — | — |
| >>>>PDCP DL Count | O | | PDCP Count 9.3.1.35 | PDCP count for next DL packet to be assigned. | — | — |
| >>>>PDCP UL Count | O | | PDCP Count 9.3.1.35 | PDCP count for first un-acknowledged UL packet. | — | — |
| Cause | M | | 9.3.1.2 | | YES | ignore |

| Range bound | Explanation |
|---|---|
| maxnoofDRBs | Maximum no. of DRBs for a UE. Value is 32. |
| maxnoofUEs | Maximum no. of UEs that can be involved in a group bearer context setup. |

In some embodiments, the CU-CP provides grouping information for UE contexts. This may be done in several ways. As one example, when a UE/IAB-MT bearer context is being set up at the CU-UP, a group ID is included. For example, in the bearer context setup or modification request messages, a new IE could be included, e.g., gNB-CU-CP Group E1AP ID, that indicates to which UE group the UE/IAB-MT belongs to.

During the context release procedure, only the group identification information is included, indicating to the CU-UP that it is to release the bearer contexts of all the UEs under this group. If the release is to be performed only for the subset of the group, in some embodiments an exception list may be provided, and the CU-UP releases the bearer contexts of all UEs under the indicated group except for those that are included in the exception list.

In some embodiments, more than one group identification information could be included in the context release message, which indicates all the bearer contexts under each group, except for those in the exception list, are to be released.

Example messages are described below.

The BEARER CONTEXT SETUP REQUEST message is sent by the gNB-CU-CP to request the gNB-CU-UP to setup a bearer context.
Direction: gNB-CU-CP to gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |

-continued

| IE/Group Name | Presence | Range | IE type and reference | Semantics description | Criticality | Assigned Criticality |
|---|---|---|---|---|---|---|
| gNB-CU-CP Group E1AP ID | O | | 9.3.1.x | | YES | reject |
| Security Information | M | | 9.3.1.10 | | YES | reject |
| UE DL Aggregate Maximum Bit Rate | M | | Bit Rate 9.3.1.20 | | YES | reject |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. | YES | reject |
| Serving PLMN | M | | PLMN Identity 9.3.1.7 | | YES | ignore |
| Activity Notification Level | M | | 9.3.1.67 | | YES | reject |
| UE Inactivity Timer | O | | Inactivity Timer 9.3.1.54 | Included if the Activity Notification Level is set to UE. | — | — |
| Bearer Context Status Change | O | | ENUMERATED (Suspend, Resume, . . .) | Indicates the status of the Bearer Context | YES | reject |
| CHOICE System >E-UTRAN | M | | | | YES | reject |
| >>DRB To Setup List | M | | DRB To Setup List E-UTRAN 9.3.3.1 | | YES | reject |
| >>Subscriber Profile ID for RAT/Frequency priority | O | | 9.3.1.69 | | YES | ignore |
| >>Additional RRM Policy Index >NG-RAN | O | | 9.3.1.70 | | YES | Ignore |
| >>PDU Session Resource To Setup List | M | | 9.3.3.2 | | YES | reject |
| RAN UE ID | O | | OCTET STRING (SIZE(8)) | | YES | ignore |
| gNB-DU ID | O | | 9.3.1.65 | Included whenever it is known by the gNB-CU-CP | YES | ignore |
| Trace Activation | O | | 9.3.1.68 | | YES | ignore |

The gNB-CU-CP Group E1AP ID uniquely identifies the bearer context group that a UE belongs to.

| IE/Group Name | Presence | Range | IE type and reference | Semantics description |
|---|---|---|---|---|
| gNB-CU-CP Group E1AP ID | M | | INTEGER $(0 \ldots 2^{32} - 1)$ | |

The GROUP BEARER CONTEXT RELEASE COMMAND message is sent by the gNB-CU-CP to command the gNB-CU-UP to release an UE-associated logical E1 connection.

Direction: gNB-CU-CP to gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| UE context Group Info List | M | | | | | |
| >UE context Group Info List Item | | 1 . . . <maxnoofGroups> | | | | |
| >>gNB-CU-CP Group E1AP ID | M | INTEGER (0 . . . $2^{32}$-1) | | | | |
| UE context to be exempt Info List | M | | | | | |
| >UE context to be exempt Info List Item | O | 1 . . . <maxnoofUEs> | | | | |
| >>gNB-CU-CP UE E1AP ID | M | | 9.3.1.4 | | YES | reject |
| >>gNB-CU-UP UE E1AP ID | M | | 9.3.1.5 | | YES | reject |

For IAB-networks, the MT of the IAB node serving the UE or IAB-MT may be indicated in the bearer context setup of a UE for some embodiments. For example, the bearer context setup request or modification request messages may include a new IE, e.g., gNB-CU-CP parent IAB-MT E1AP ID, that indicates the IAB node serving the UE/IAB-MT. The reception of the legacy UE associated bearer context message that includes the E1AP ID of the IAB-MT thus can be interpreted by the CU-UP to mean that the bearer contexts of all the UEs that are associated with the indicated IAB-MT are to be released as well.

Particular embodiments are also applicable where different bearers of a given UE are served by multiple CU-UPs, in which case the E1AP procedures pertaining to the same UE/IAB-MT (but pertaining to different bearers therein) will be executed between the CU-CP and multiple CU-UPs.

Figure 13:
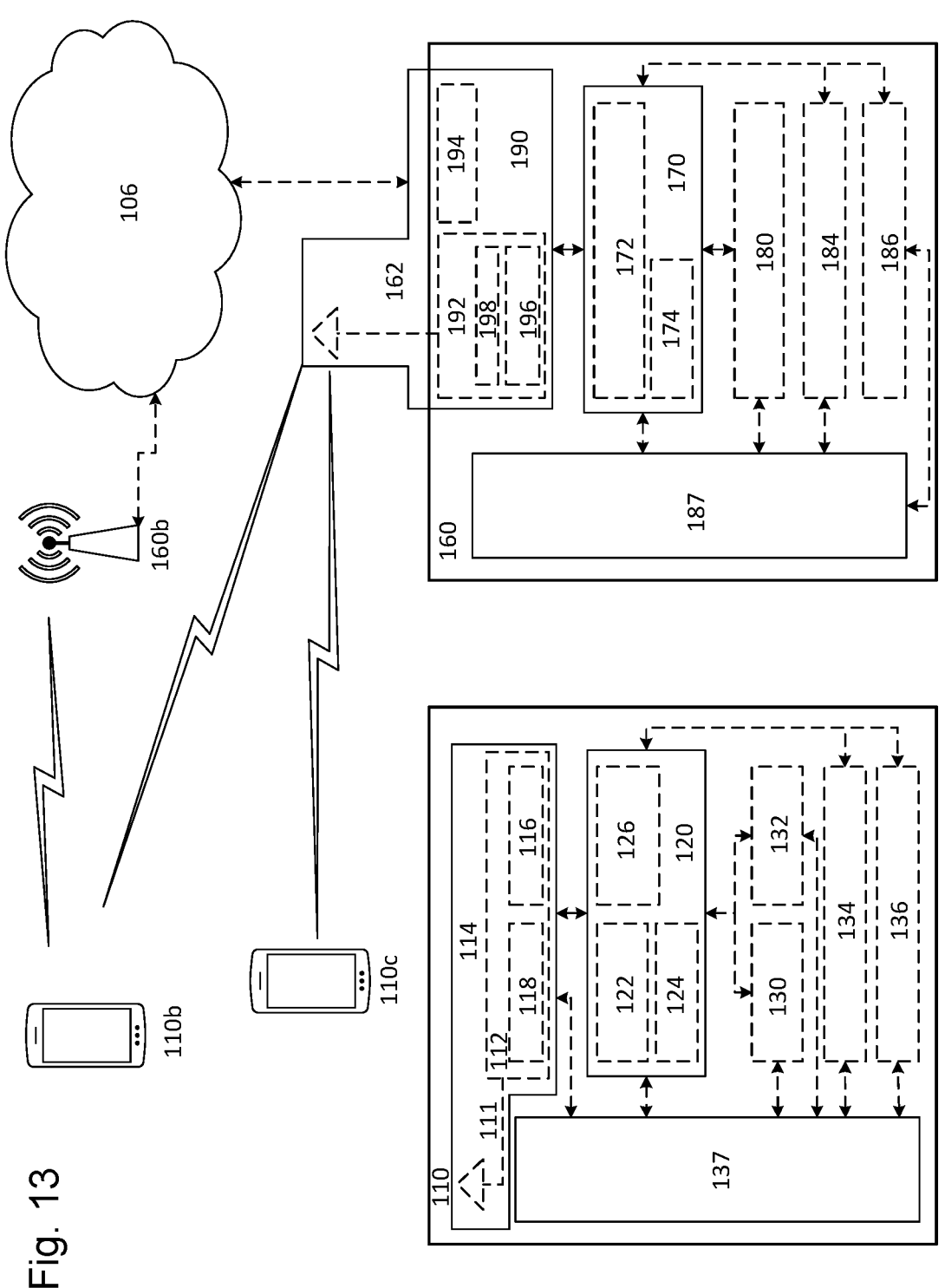
FIG. 13 is a block diagram illustrating an example wireless network.

FIG. 13 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. The operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 13 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 14:
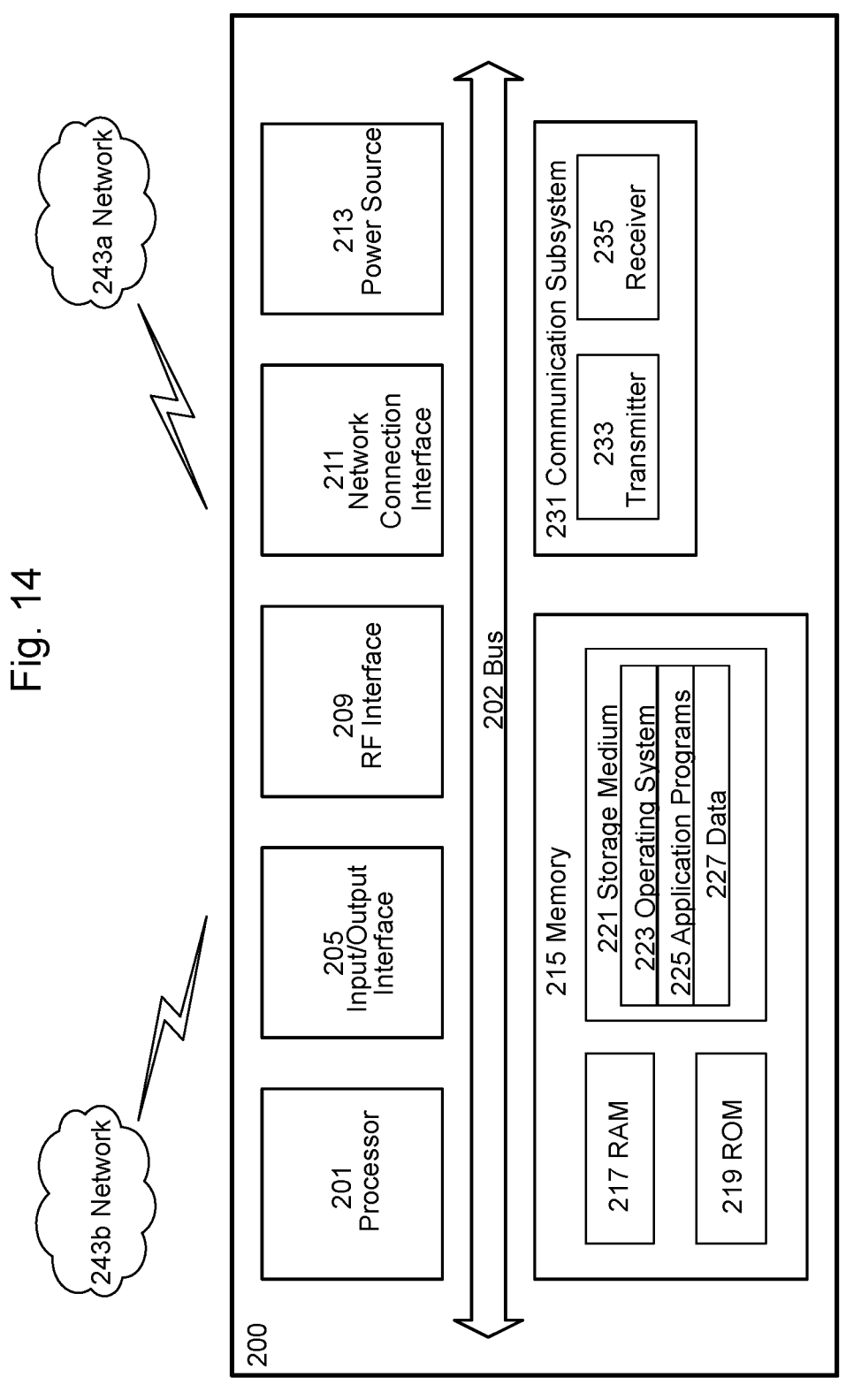
FIG. 14 illustrates an example user equipment, according to certain embodiments.

FIG. 14 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 14, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 15A:
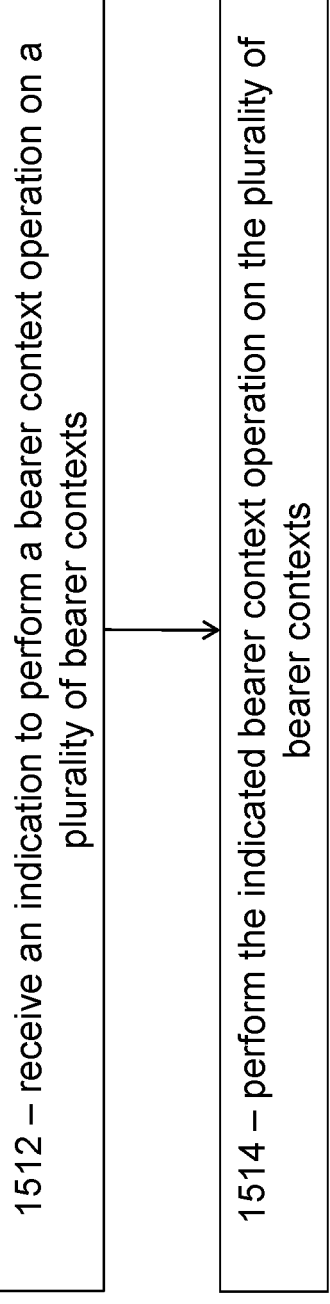
FIG. 15A is a flowchart illustrating an example method in a network node, according to certain embodiments.

FIG. 15A is a flowchart illustrating an example method in a network node, according to certain embodiments. In particular embodiments, one or more steps of FIG. 15A may be performed by network node 160 described with respect to FIG. 13. The network node is operable to perform a group handover.

The method begins at step 1512 where a network node (e.g., network node 160) receives an indication to perform a bearer context operation on a plurality of bearer contexts. For example, as part of a group handover, instead of individually signaling bearer operations for each UE, the network node may receive one indication to perform a bearer operation for bearer contexts associated with a plurality of UEs. The bearer context operations may include any of the group bearer commands described above (e.g., GROUP BEARER CONTEXT SETUP REQUEST, GROUP BEARER CONTEXT SETUP RESPONSE, GROUP BEARER CONTEXT SETUP FAILURE, GROUP BEARER CONTEXT RELEASE COMMAND, GROUP BEARER CONTEXT RELEASE COMPLETE, GROUP BEARER CONTEXT RELEASE REQUEST, GROUP BEARER CONTEXT MODIFICATION REQUEST, GROUP BEARER CONTEXT MODIFICATION RESPONSE, and GROUP BEARER CONTEXT MODIFICATION FAILURE).

In particular embodiments, the network node comprises a source network node and the bearer context operation comprises at least one of a bearer context modification request (e.g., GROUP BEARER CONTEXT MODIFICATION REQUEST) and a bearer context release request (e.g., GROUP BEARER CONTEXT RELEASE COMMAND). In some embodiments, the network node comprises a target network node and the bearer context operation comprises at least one of a bearer context modification request (e.g., GROUP BEARER CONTEXT MODIFICATION REQUEST) and a bearer context setup request (e.g., GROUP BEARER CONTEXT SETUP COMMAND).

In particular embodiments, the indication incudes a list identifying the plurality of bearer contexts (e.g., the UE Bearer context Info List described above). In some embodiments, the indication includes a group identifier identifying the plurality of bearer contexts (e.g., the gNB-CU-CP Group E1AP ID described above). The indication may further comprise a list identifying bearer contexts to exclude from the plurality of bearer contexts identified by the group identifier.

In some embodiments, the indication comprises an identifier of an IAB node and the plurality of bearer contexts comprise bearer contexts associated with the IAB node (e.g., UEs and IAB MTs).

In particular embodiments, the network node comprises a CU-UP, and the network node receives the indication from a CU-CP (e.g., via E1 interface).

At step 1514, the network node performs the indicated bearer context operation on the plurality of bearer contexts. For example, the network node may perform any of the setup, release, and/or modification operations described above.

Modifications, additions, or omissions may be made to method 1500 of FIG. 15A. Additionally, one or more steps in the method of FIG. 15A may be performed in parallel or in any suitable order.

Figure 15B:
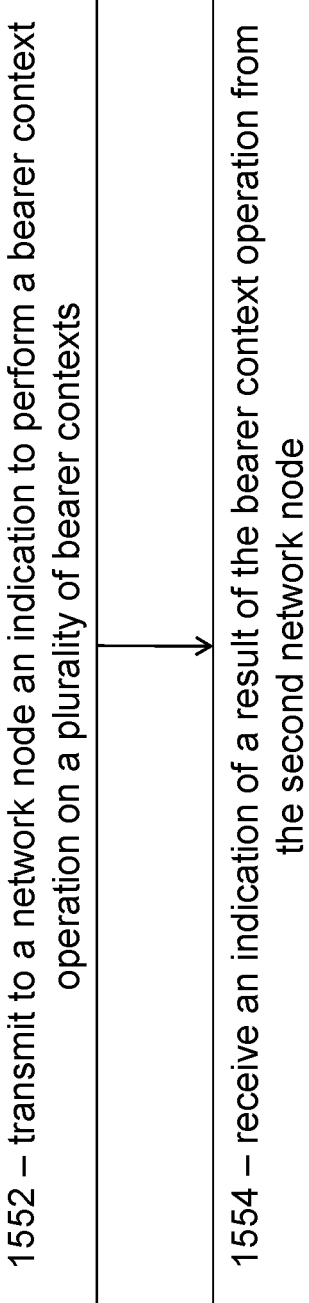
FIG. 15B is a flowchart illustrating an example method in another network node, according to certain embodiments.

FIG. 15B is a flowchart illustrating an example method in a network node, according to certain embodiments. In particular embodiments, one or more steps of FIG. 15B may be performed by network node 160 described with respect to FIG. 13. The network node is operable to perform a group handover.

The method begins at step 1552 where a first network node (e.g., network node 160) transmits an indication to a second network node (e.g., network node 160) to perform a bearer context operation on a plurality of bearer contexts. For example, as part of a group handover, instead of individually signaling bearer operations for each UE, the network node may transmit one indication to perform a bearer operation for bearer contexts associated with a plurality of UEs. The bearer context operations may include any of the group bearer commands described above (e.g., GROUP BEARER CONTEXT SETUP REQUEST, GROUP BEARER CONTEXT SETUP RESPONSE, GROUP BEARER CONTEXT SETUP FAILURE, GROUP BEARER CONTEXT RELEASE COMMAND, GROUP BEARER CONTEXT RELEASE COMPLETE, GROUP BEARER CONTEXT RELEASE REQUEST, GROUP BEARER CONTEXT MODIFICATION REQUEST, GROUP BEARER CONTEXT MODIFICATION RESPONSE, and GROUP BEARER CONTEXT MODIFICATION FAILURE).

In particular embodiments, the first network node comprises a CU-CP, and the second network node comprises a CU-UP.

In particular embodiments, the second network node comprises a source network node and the bearer context operation comprises at least one of a bearer context modification request (e.g., GROUP BEARER CONTEXT MODIFICATION REQUEST) and a bearer context release request (e.g., GROUP BEARER CONTEXT RELEASE COMMAND). In some embodiments, the second network node comprises a target network node and the bearer context operation comprises at least one of a bearer context modification request (e.g., GROUP BEARER CONTEXT MODIFICATION REQUEST) and a bearer context setup request (e.g., GROUP BEARER CONTEXT SETUP COMMAND).

In particular embodiments, the indication is as described with respect to FIG. 15A.

At step 1554, the network node receives an indication of a result of the bearer context operation from the second network node. For example, the network node may receive the results of any of the setup, release, and/or modification operations described above.

Modifications, additions, or omissions may be made to method 1550 of FIG. 15B. Additionally, one or more steps in the method of FIG. 15B may be performed in parallel or in any suitable order.

Figure 16:
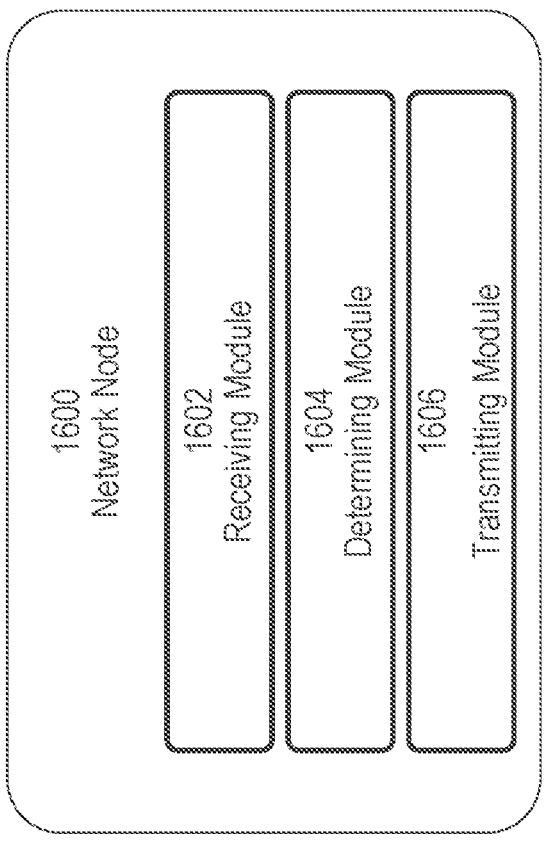
FIG. 16 illustrates an example wireless device, according to certain embodiments.

FIG. 16 illustrates an example network node, according to certain embodiments. The apparatus may be implemented in a network node (e.g., network node 160 illustrated in FIG. 1). Apparatus 1600 is operable to carry out the example methods described with reference to FIGS. 15A and 15B and possibly any other processes or methods disclosed herein. It is also to be understood that the methods of FIGS. 15A and 15B are not necessarily carried out solely by apparatus 1600. At least some operations of the method can be performed by one or more other entities, including virtual apparatuses.

Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1602, determining module 1604, transmitting module 1606, and any other suitable units of apparatus 1600 to perform corresponding functions according one or more embodiments of the present disclosure.

As illustrated in FIG. 16, apparatus 1600 includes receiving module 1602, determining module 1604, and transmitting module 1606. In certain embodiments, receiving module 1602 may receive configuration requests and/or responses for group bearer context operations according to any of the embodiments and examples described herein. Determining module 1604 may determine what bearer contexts are associated with a bearer context request and/or response according to any of the embodiments and examples described herein. In certain embodiments, transmitting module 1606 may transmit an indication group context requests and/or responses according to any of the embodiments and examples described herein.

Figure 17:
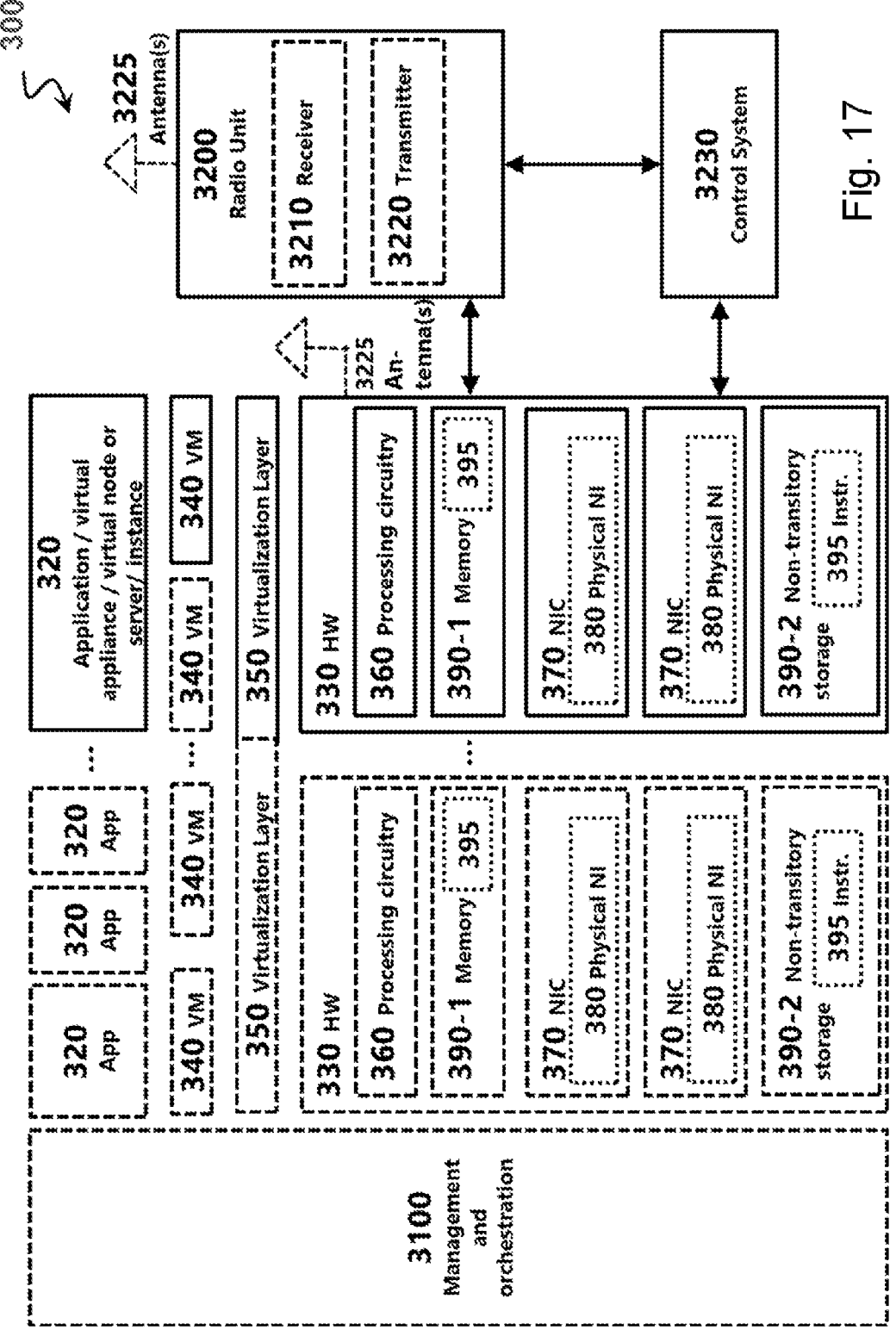
FIG. 17 illustrates an example virtualization environment, according to certain embodiments.

FIG. 17 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 17, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 17.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 18:
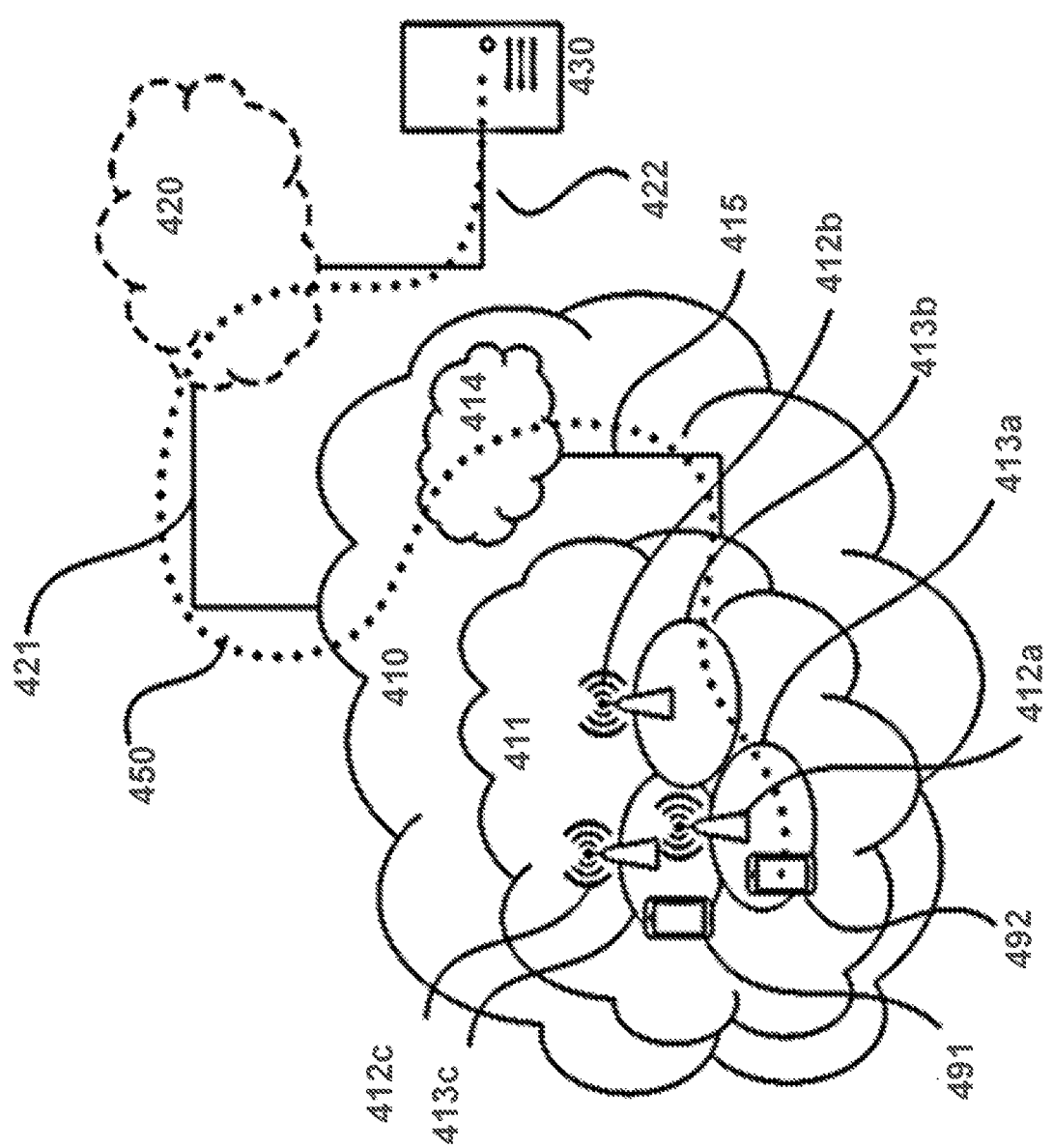
FIG. 18 illustrates an example telecommunication network connected via an intermediate network to a host computer, according to certain embodiments.

With reference to FIG. 18, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 18 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station

412 need not be aware of the future routing of an outgoing uplink communication originating from the UE 491 towards the host computer 430.

Figure 19:
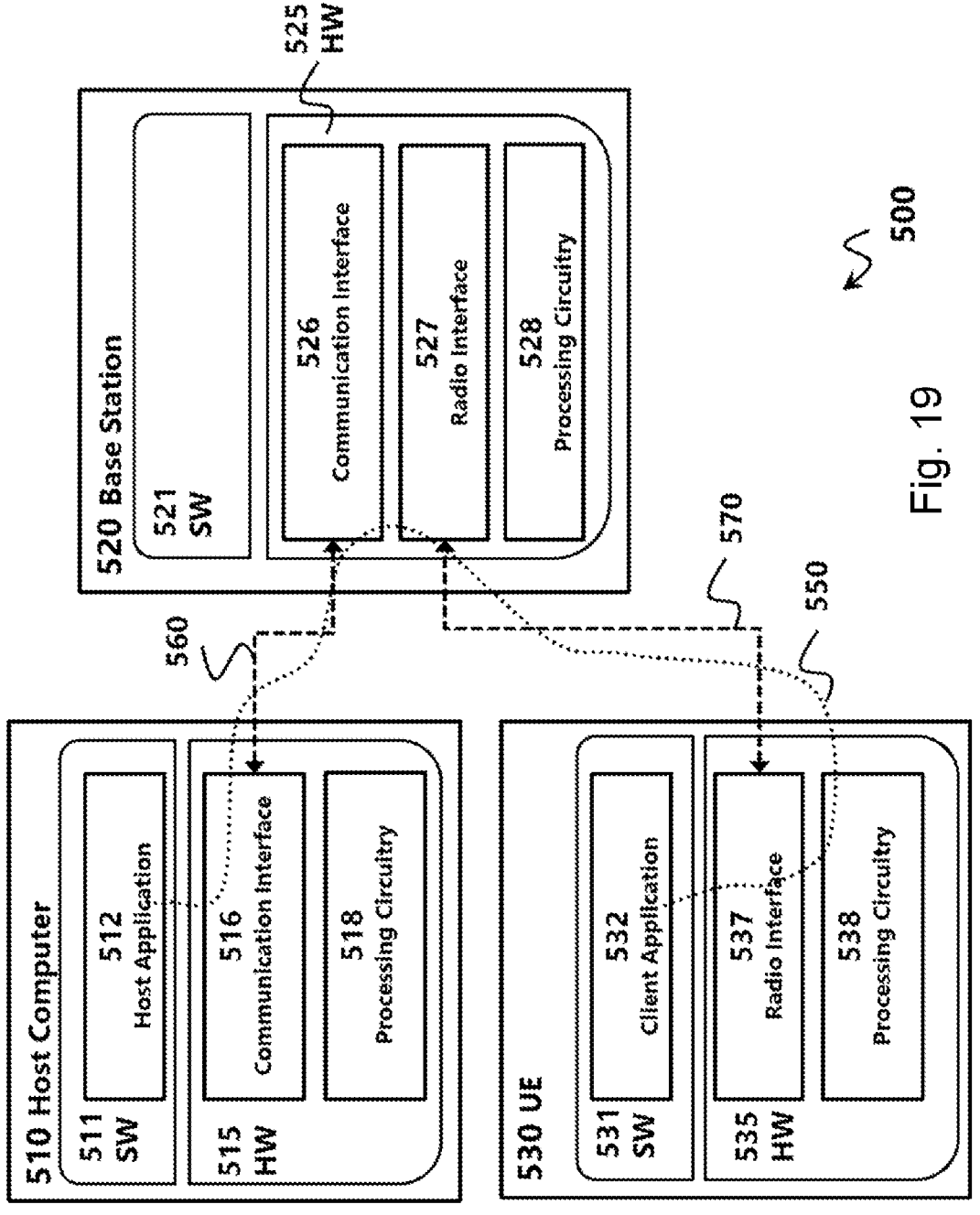
FIG. 19 illustrates an example host computer communicating via a base station with a user equipment over a partially wireless connection, according to certain embodiments.

FIG. 19 illustrates an example host computer communicating via a base station with a user equipment over a partially wireless connection, according to certain embodiments. Example implementations, in accordance with an embodiment, of the UE, base station and host computer discussed in the preceding paragraphs will now be described with reference to FIG. 19. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 19) served by base station 520. Communication interface 526 may be configured to facilitate connection 560 to host computer 510. Connection 560 may be direct, or it may pass through a core network (not shown in FIG. 19) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 19 may be similar or identical to host computer 430, one of base stations 412*a*, 412*b*, 412*c* and one of UEs 491, 492 of FIG. 18, respectively. This is to say, the inner workings of these entities may be as shown in FIG. 15 and independently, the surrounding network topology may be that of FIG. 18.

In FIG. 19, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 20:
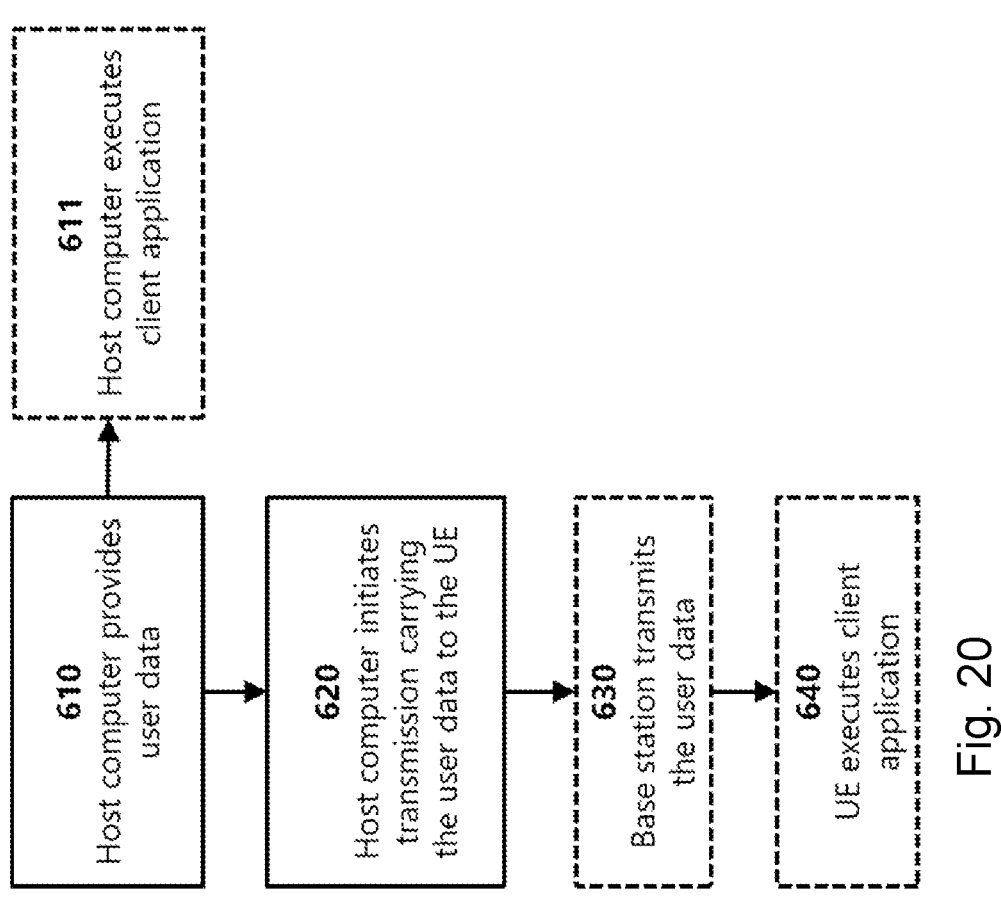
FIG. 20 is a flowchart illustrating a method implemented, according to certain embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 21:
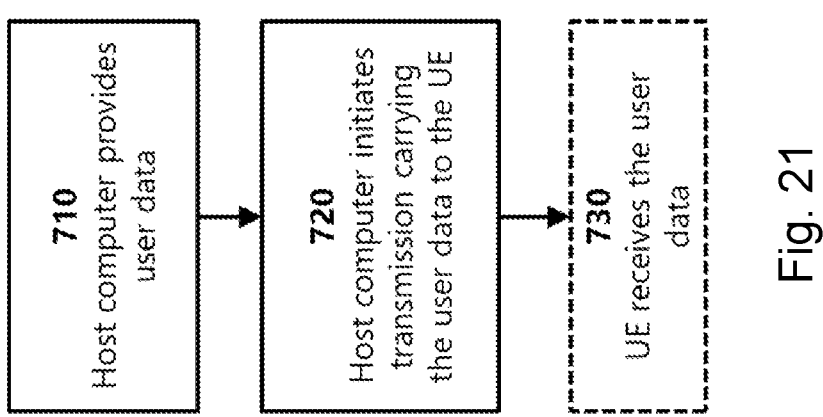
FIG. 21 is a flowchart illustrating a method implemented in a communication system, according to certain embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
| --- | --- |
| 1x RTT | CDMA2000 1x Radio Transmission Technology |
| 3GPP | 3rd Generation Partnership Project |
| 5G | 5th Generation |
| 5GC | 5G Core |
| ARQ | Automatic Repeat Request |
| BAP | Backhaul Adaptation Protocol |
| BCCH | Broadcast Control Channel |
| BCH | Broadcast Channel |
| BLER | Block Error Rate |
| CA | Carrier Aggregation |
| CC | Carrier Component |
| CDMA | Code Division Multiplexing Access |
| CGI | Cell Global Identifier |
| CP | Cyclic Prefix or Control Panel |
| CQI | Channel Quality information |
| C-RNTI | Cell RNTI |
| CSI | Channel State Information |
| DC | Dual Connectivity |
| DCCH | Dedicated Control Channel |
| DCI | Downlink Control Information |
| DFTS OFDM | Discrete Fourier Transform Spread OFDM |
| DL | Downlink |
| DM | Demodulation |
| DMRS | Demodulation Reference Signal |
| DRB | Data Radio Bearer |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| EPC | Evolved Packet Core |
| ePDCCH | enhanced Physical Downlink Control Channel |
| EPS | Evolved Packet System |
| E-SMLC | evolved Serving Mobile Location Center |
| E-UTRA | Evolved UTRA |
| E-UTRAN | Evolved UTRAN |
| FDD | Frequency Division Duplex |
| GERAN | GSM EDGE Radio Access Network |
| gNB | Base station in NR |
| GNSS | Global Navigation Satellite System |
| GPRS | General Packet Radio Service |
| GSM | Global System for Mobile communication |
| GTP | GPRS Tunneling Protocol |
| HARQ | Hybrid Automatic Repeat Request |
| HO | Handover |
| HSPA | High Speed Packet Access |
| HRPD | High Rate Packet Data |
| IAB | Integrated Accell and Backhaul |
| L1 | Layer 1 |
| LLR | Log Likelihood Ratio |
| LOS | Line of Sight |
| LPP | LTE Positioning Protocol |
| LTE | Long-Term Evolution |
| MAC | Medium Access Control |
| MCS | Modulation and Coding Scheme |
| MDT | Minimization of Drive Tests |
| MIB | Master Information Block |
| MIMO | Multiple Input Multiple Output |
| MME | Mobility Management Entity |
| MN | Master Node |
| MR-DC | Multiple RAT Dual Connectivity |
| MSC | Mobile Switching Center |

-continued

| Abbreviation | Explanation |
|---|---|
| NG | New Generation |
| NPDCCH | Narrowband Physical Downlink Control Channel |
| NR | New Radio |
| OFDM | Orthogonal Frequency Division Multiplexing |
| OFDMA | Orthogonal Frequency Division Multiple Access |
| OSS | Operations Support System |
| O&M | Operation and Maintenance |
| PA | Power Amplifier |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDCP | Packet Data Convergence Protcol |
| PDN | Packet Data Network |
| PDP | Profile Delay Profile |
| PDSCH | Physical Downlink Shared Channel |
| PDU | Protocol Data Unit |
| PGW | Packet Gateway |
| PHICH | Physical Hybrid-ARQ Indicator Channel |
| PHY | Physical Layer |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |
| PUSCH | Physical Uplink Shared Channel |
| RACH | Random Access Channel |
| QAM | Quadrature Amplitude Modulation |
| RAN | Radio Access Network |
| RAT | Radio Access Technology |
| RF | Radio Frequency |
| RLC | Radio Link Control |
| RLM | Radio Link Management |
| RNC | Radio Network Controller |
| RNL | Radio Network Layer |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SC | Successive Cancellation |
| SCL | Successive Cancellation List |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SN | Secondary Node |
| SNR | Signal to Noise Ratio |
| SON | Self Optimized Network |
| SPS | Semi-Persistent Scheduling |
| SRB | Signaling Radio Bearing |
| SRI | SRS Resource Indicator |
| SRS | Sounding Reference Signal |
| SS | Synchronization Signal |
| SSB | Synchronization Signal Block |
| SSS | Secondary Synchronization Signal |
| TDD | Time Division Duplex |
| TDOA | Time Difference of Arrival |
| TEID | Tunneling Endpoint Identifier |
| TFRE | Time Freqency Resource Element |
| TNL | Transport Network Layer |
| TOA | Time of Arrival |
| TPMI | Transmit Procoder Matrix Indicator |
| TRI | Transmission Rank Indicator |
| TSS | Tertiary Synchronization Signal |
| TTI | Transmission Time Interval |

-continued

| Abbreviation | Explanation |
|---|---|
| UCI | Uplink Control Information |
| UE | User Equipment |
| UL | Uplink |
| UMTS | Universal Mobile Telecommunication System |
| UP | User Plane |
| URLLC | Ultra Reliable Low Latency Communication |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| V2X | Vehicle to everything |
| VoIP | Voice over Internet Protocol |
| WCDMA | Wide CDMA |
| WLAN | Wide Local Area Network |

The invention claimed is:

1. A method for use in a network node for performing a group handover, the method comprising:

receiving an indication to perform a bearer context operation on a plurality of bearer contexts, wherein the indication to perform the bearer context operation on the plurality of bearer contexts comprises an indication to perform one of a bearer context modification request, bearer context release request, or bearer context setup request for the plurality of bearer contexts, where the plurality of bearer contexts are associated with a plurality of user equipments or integrated access and backhaul mobile terminals, and wherein receiving the indication comprises receiving a group command; and performing the indicated bearer context operation on the plurality of bearer contexts.

2. A network node operable to perform a group handover, the network node comprising processing circuitry operable to:

receive an indication to perform a bearer context operation on a plurality of bearer contexts, wherein the indication to perform the bearer context operation on the plurality of bearer contexts comprises an indication to perform one of a bearer context modification request, bearer context release request, or bearer context setup request for the plurality of bearer contexts, where the plurality of bearer contexts are associated with a plurality of user equipments or integrated access and backhaul mobile terminals, and wherein the processing circuitry is operable to receive the indication by receiving a group command; and perform the indicated bearer context operation on the plurality of bearer contexts.

3. The network node of claim 2, wherein the indication incudes a list identifying the plurality of bearer contexts.

4. The network node of claim 2, wherein the indication includes a group identifier identifying the plurality of bearer contexts.

5. The network node of claim 4, wherein the indication further comprises a list identifying bearer contexts to exclude from the plurality of bearer contexts identified by the group identifier.

6. The network node of claim 2, wherein the indication comprises an identifier of an integrated access and backhaul (IAB) node and the plurality of bearer contexts comprise bearer contexts associated with the IAB node.

7. The network node of claim 2, wherein the network node comprises a source network node and the bearer context operation comprises at least one of a bearer context modification request and a bearer context release request.

8. The network node of claim 2, wherein the network node comprises a target network node and the bearer context operation comprises at least one of a bearer context modification request and a bearer context setup request.

9. The network node of claim 2, wherein the network node comprises a centralized unit (CU) user plane (UP), and the network node receives the indication from a centralized unit (CU) control plane (CP).

10. The network node of claim 2, wherein the plurality of bearer contexts are associated with at least one of a user equipment and an integrated access and backhaul (IAB) node mobile termination (MT).

11. A method for use in a first network node for performing a group handover, the method comprising:

transmitting an indication to a second network node to perform a bearer context operation on a plurality of bearer contexts, wherein the indication to perform the bearer context operation on the plurality of bearer contexts comprises an indication to perform one of a bearer context modification request, bearer context release request, or bearer context setup request for the plurality of bearer contexts, where the plurality of bearer contexts are associated with a plurality of user equipments or integrated access and backhaul mobile terminals, and wherein transmitting the indication comprises transmitting a group command; and receiving an indication of a result of the bearer context operation from the second network node.

12. A network node operable to perform a group handover, the network node comprising processing circuitry operable to:

transmit an indication to a second network node to perform a bearer context operation on a plurality of bearer contexts, wherein the indication to perform the bearer context operation on the plurality of bearer contexts comprises an indication to perform one of a bearer context modification request, bearer context release request, or bearer context setup request for the plurality of bearer contexts, where the plurality of bearer contexts are associated with a plurality of user equipments or integrated access and backhaul mobile terminals, and wherein the processing circuitry is operable to transmit the indication by transmitting a group command; and receive an indication of a result of the bearer context operation from the second network node.

13. The network node of claim 12, wherein the indication incudes a list identifying the plurality of bearer contexts.

14. The network node of claim 12, wherein the indication includes a group identifier identifying the plurality of bearer contexts.

15. The network node of claim 14, wherein the indication further comprises a list identifying bearer contexts to exclude from the plurality of bearer contexts identified by the group identifier.

16. The network node of claim 12, wherein the indication comprises an identifier of an integrated access and backhaul (IAB) node and the plurality of bearer contexts comprise bearer contexts associated with the IAB node.

17. The network node of claim 12, wherein the second network node comprises a source network node and the bearer context operation comprises at least one of a bearer context modification request and a bearer context release request.

18. The network node of claim 12, wherein the second network node comprises a target network node and the bearer context operation comprises at least one of a bearer context modification request and a bearer context setup request.

19. The network node of claim 12, wherein the first network node comprises a centralized unit (CU) control plane (CP), and the second network node comprises a centralized unit (CU) user plane (UP).

20. The network node of claim 12, wherein the plurality of bearer contexts are associated with at least one of a user equipment and an integrated access and backhaul (IAB) node mobile termination (MT).

\* \* \* \* \*